US011951772B2

United States Patent
Shimizu

(10) Patent No.: US 11,951,772 B2
(45) Date of Patent: Apr. 9, 2024

(54) PNEUMATIC TIRE

(71) Applicant: The Yokohama Rubber Co., LTD., Tokyo (JP)

(72) Inventor: Masatoshi Shimizu, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 393 days.

(21) Appl. No.: 16/765,454

(22) PCT Filed: Oct. 15, 2018

(86) PCT No.: PCT/JP2018/038366
§ 371 (c)(1),
(2) Date: May 19, 2020

(87) PCT Pub. No.: WO2019/097927
PCT Pub. Date: May 23, 2019

(65) Prior Publication Data
US 2020/0276867 A1 Sep. 3, 2020

(30) Foreign Application Priority Data
Nov. 20, 2017 (JP) .................. 2017-222674

(51) Int. Cl.
*B60C 11/01* (2006.01)
*B60C 11/00* (2006.01)
(Continued)

(52) U.S. Cl.
CPC .......... *B60C 11/01* (2013.01); *B60C 11/0083* (2013.01); *B60C 11/1376* (2013.01);
(Continued)

(58) Field of Classification Search
CPC .............. B60C 2011/033; B60C 11/01; B60C 2011/0016; B60C 11/00; B60C 9/0292;
(Continued)

(56) References Cited

U.S. PATENT DOCUMENTS

2006/0231181 A1\* 10/2006 Roder .................. B60C 11/005
152/209.5
2011/0214788 A1\* 9/2011 Chambriard .............. B60C 9/20
152/209.1
(Continued)

FOREIGN PATENT DOCUMENTS

| CN | 104321206 | 1/2015 |
| CN | 104718088 | 6/2015 |

(Continued)

OTHER PUBLICATIONS

JP 2007-237799 Machine Translation; Ogawa, Yukihiro (Year: 2007).\*

(Continued)

*Primary Examiner* — Robert C Dye
*Assistant Examiner* — Nicholas J Weiler
(74) *Attorney, Agent, or Firm* — Thorpe North & Western

(57) ABSTRACT

In a pneumatic tire, a tread portion includes a main groove extending in a circumferential direction, and land portions defined by the main groove. A center region is a region where a center land portion included in the land portions is closest to a tire equatorial plane. Shoulder regions are each a region between a position corresponding to 85% of a width of the belt layer in a lateral direction and an end portion of the belt layer in the lateral direction, and intermediate regions are each a region between the center region and a corresponding one of the shoulder regions. A relationship among a tire average thickness Gc in the center region, a tire average thickness Gsh in the shoulder regions, and a tire average thickness Gm in the intermediate regions is within a range of $1.05 \leq (Gc/Gsh) \leq 1.35$ and satisfies $Gc \geq Gm > Gsh$.

18 Claims, 13 Drawing Sheets

(51) Int. Cl.
  *B60C 11/03* (2006.01)
  *B60C 11/13* (2006.01)
  *B60C 9/22* (2006.01)
  *B60C 17/00* (2006.01)

(52) U.S. Cl.
  CPC ..... *B60C 9/2204* (2013.01); *B60C 2011/0025* (2013.01); *B60C 2011/0033* (2013.01); *B60C 2011/0348* (2013.01); *B60C 17/0009* (2013.01)

(58) Field of Classification Search
  CPC ......... B60C 11/1376; B60C 2011/0025; B60C 2011/0348; B60C 2009/2041; B60C 2009/2333
  See application file for complete search history.

(56) References Cited

U.S. PATENT DOCUMENTS

| | | | |
|---|---|---|---|
| 2012/0132332 A1* | 5/2012 | Zhao | B60C 11/00 152/209.5 |
| 2015/0114536 A1 | 4/2015 | Hamanaka et al. | |
| 2015/0151582 A1 | 6/2015 | Hamanaka et al. | |
| 2015/0165822 A1 | 6/2015 | Koutoku | |
| 2015/0251496 A1* | 9/2015 | Yamaguchi | B60C 9/18 152/209.18 |
| 2015/0298505 A1 | 10/2015 | Iga | |
| 2016/0257169 A1* | 9/2016 | Kuwayama | B60C 11/0306 |
| 2017/0028782 A1* | 2/2017 | Miyake | B60C 9/20 |
| 2017/0036494 A1 | 2/2017 | Ogawa | |
| 2017/0203614 A1* | 7/2017 | Kato | B60C 11/042 |
| 2017/0210174 A1* | 7/2017 | Suga | B60C 11/00 |
| 2017/0297377 A1* | 10/2017 | Honda | B60C 11/0304 |
| 2018/0079258 A1 | 3/2018 | Suga | |

FOREIGN PATENT DOCUMENTS

| | | | | |
|---|---|---|---|---|
| CN | 107206842 | | 9/2017 | |
| DE | 10311430 A1 | * | 9/2004 | ......... B60C 11/0302 |
| DE | 11 2012 006 301 T5 | | 1/2015 | |
| DE | 11 2013 002 470 T5 | | 2/2015 | |
| DE | 11 2013 002 605 T5 | | 2/2015 | |
| EP | 0 413 574 | | 2/1991 | |
| JP | S59-124406 | | 7/1984 | |
| JP | H03-79404 | | 4/1991 | |
| JP | H03-200402 | | 9/1991 | |
| JP | H04-243601 | | 8/1992 | |
| JP | H07-81313 A | * | 3/1995 | ......... B60C 11/0302 |
| JP | 2002-002216 | | 1/2002 | |
| JP | 2002-301914 | | 10/2002 | |
| JP | 2004-345557 | | 12/2004 | |
| JP | 2006-264595 A | | 10/2006 | |
| JP | 2007237799 A | * | 9/2007 | |
| JP | 2009-262808 | | 11/2009 | |
| JP | 2010-247780 | | 11/2010 | |
| JP | 5567839 | | 8/2014 | |
| JP | 2015-205583 | | 11/2015 | |
| WO | WO 2014/010093 | | 1/2014 | |
| WO | WO 2014/057548 | | 4/2014 | |
| WO | WO 2015/159576 | | 10/2015 | |
| WO | WO 2016/148123 | | 9/2016 | |

OTHER PUBLICATIONS

JP H07-81313 Machine Translation; Hiroshi, Imai (Year: 1995).*
DE 10311430 Machine Translation; Schildhauer, Manfred (Year: 2003).*
International Search Report for International Application No. PCT/JP2018/038366 dated Oct. 15, 2018, 4 pages, Japan.
International Search Report for International Application No. PCT/JP2018/038366 dated Jan. 15, 2019, 4 pages, Japan.

* cited by examiner

| | CONVENTIONAL EXAMPLE | COMPARATIVE EXAMPLE 1 | COMPARATIVE EXAMPLE 2 | COMPARATIVE EXAMPLE 3 | EXAMPLE 1 | EXAMPLE 2 | EXAMPLE 3 |
|---|---|---|---|---|---|---|---|
| TIRE AVERAGE THICKNESS: $Gc/Gsh$ | 0.95 | 1.03 | 1.40 | 1.20 | 1.20 | 1.20 | 1.20 |
| TIRE AVERAGE THICKNESS: $Gm/Gsh$ | 0.98 | 1.02 | 1.30 | 1.30 | 1.15 | 1.15 | 1.15 |
| AVERAGE THICKNESS OF TREAD RUBBER LAYER: $Tc/Tsh$ | 1.15 | 1.15 | 1.15 | 1.15 | 1.15 | 1.50 | 1.50 |
| AVERAGE THICKNESS OF TREAD RUBBER LAYER: $Tm/Tsh$ | 1.10 | 1.10 | 1.10 | 1.10 | 1.10 | 1.30 | 1.30 |
| AVERAGE ACTUAL RUBBER THICKNESS OF TREAD RUBBER LAYER: $Vc/Vsh$ | 1.40 | 1.40 | 1.40 | 1.40 | 1.40 | 1.40 | 2.00 |
| PRESENCE OF PROTRUSION-SHAPED LAND PORTION | NO | NO | NO | NO | NO | NO | NO |
| RADIUS OF CURVATURE OF PROTRUSION-SHAPED LAND PORTION: $RR/TR$ | - | - | - | - | - | - | - |
| PRESENCE OF BULGING INWARD OF BELT LAYER IN TIRE RADIAL DIRECTION | NO | NO | NO | NO | NO | NO | NO |
| $Tg/Tc$ | 0.1 | 0.1 | 0.1 | 0.1 | 0.1 | 0.1 | 0.1 |
| MODULUS [MPa] OF 300% ELONGATION OF TREAD RUBBER LAYER | 9 | 9 | 9 | 9 | 9 | 9 | 9 |
| PRESENCE OF CIRCUMFERENTIAL NARROW GROOVE | NO | NO | NO | NO | NO | NO | NO |
| PRESENCE OF INWARD BULGING PORTION OF CARCASS LAYER | NO | NO | NO | NO | NO | NO | NO |
| PRESENCE OF BELT REINFORCING LAYER | NO | NO | NO | NO | NO | NO | NO |
| ARE LARGE NUMBER OF PIECES OF BELT REINFORCING LAYER LAYERED IN CENTER REGION? | - | - | - | - | - | - | - |
| PRESENCE OF SIDE REINFORCING RUBBER | NO | NO | NO | NO | NO | NO | NO |
| SHOCK BURST RESISTANCE | 100 | 103 | 108 | 98 | 106 | 108 | 109 |
| ROLLING RESISTANCE PERFORMANCE | 100 | 98 | 95 | 98 | 103 | 104 | 105 |

FIG. 11A

| | EXAMPLE 4 | EXAMPLE 5 | EXAMPLE 6 | EXAMPLE 7 | EXAMPLE 8 | EXAMPLE 9 | EXAMPLE 10 |
|---|---|---|---|---|---|---|---|
| TIRE AVERAGE THICKNESS: Gc/Gsh | 1.20 | 1.20 | 1.20 | 1.20 | 1.20 | 1.20 | 1.20 |
| TIRE AVERAGE THICKNESS: Gm/Gsh | 1.15 | 1.15 | 1.15 | 1.15 | 1.15 | 1.15 | 1.15 |
| AVERAGE THICKNESS OF TREAD RUBBER LAYER: Tc/Tsh | 1.50 | 1.50 | 1.50 | 1.50 | 1.50 | 1.50 | 1.50 |
| AVERAGE THICKNESS OF TREAD RUBBER LAYER Tm/Tsh | 1.30 | 1.30 | 1.30 | 1.30 | 1.30 | 1.30 | 1.30 |
| AVERAGE ACTUAL RUBBER THICKNESS OF TREAD RUBBER LAYER: Vc/Vsh | 2.00 | 2.00 | 2.00 | 2.00 | 2.00 | 2.00 | 2.00 |
| PRESENCE OF PROTRUSION-SHAPED LAND PORTION | YES | YES | YES | YES | YES | YES | YES |
| RADIUS OF CURVATURE OF PROTRUSION-SHAPED LAND PORTION: RR/TR | - | 0.05 | 0.5 | 0.2 | 0.2 | 0.2 | 0.2 |
| PRESENCE OF BULGING INWARD OF BELT LAYER IN TIRE RADIAL DIRECTION | NO | NO | NO | NO | YES | YES | YES |
| Tg/Tc | 0.1 | 0.1 | 0.1 | 0.1 | 0.1 | 0.5 | 0.2 |
| MODULUS [MPa] OF 300% ELONGATION OF TREAD RUBBER LAYER | 9 | 9 | 9 | 9 | 9 | 9 | 9 |
| PRESENCE OF CIRCUMFERENTIAL NARROW GROOVE | NO | NO | NO | NO | NO | NO | NO |
| PRESENCE OF INWARD BULGING PORTION OF CARCASS LAYER | NO | NO | NO | NO | NO | NO | NO |
| PRESENCE OF BELT REINFORCING LAYER | NO | NO | NO | NO | NO | NO | NO |
| ARE LARGE NUMBER OF PIECES OF BELT REINFORCING LAYER LAYERED IN CENTER REGION? | - | - | - | - | - | - | - |
| PRESENCE OF SIDE REINFORCING RUBBER | NO | NO | NO | NO | NO | NO | NO |
| SHOCK BURST RESISTANCE | 110 | 110 | 112 | 110 | 111 | 113 | 112 |
| ROLLING RESISTANCE PERFORMANCE | 105 | 105 | 101 | 106 | 106 | 102 | 105 |

FIG. 11B

|  | EXAMPLE 11 | EXAMPLE 12 | EXAMPLE 13 | EXAMPLE 14 | EXAMPLE 15 | EXAMPLE 16 | EXAMPLE 17 |
|---|---|---|---|---|---|---|---|
| TIRE AVERAGE THICKNESS: Gc/Gsh | 1.20 | 1.20 | 1.20 | 1.20 | 1.20 | 1.20 | 1.20 |
| TIRE AVERAGE THICKNESS: Gm/Gsh | 1.15 | 1.15 | 1.15 | 1.15 | 1.15 | 1.15 | 1.15 |
| AVERAGE THICKNESS OF TREAD RUBBER LAYER: Tc/Tsh | 1.50 | 1.50 | 1.50 | 1.50 | 1.50 | 1.50 | 1.50 |
| AVERAGE THICKNESS OF TREAD RUBBER LAYER Tm/Tsh | 1.30 | 1.30 | 1.30 | 1.30 | 1.30 | 1.30 | 1.30 |
| AVERAGE ACTUAL RUBBER THICKNESS OF TREAD RUBBER LAYER: Vc/Vsh | 2.00 | 2.00 | 2.00 | 2.00 | 2.00 | 2.00 | 2.00 |
| PRESENCE OF PROTRUSION-SHAPED LAND PORTION | YES | YES | YES | YES | YES | YES | YES |
| RADIUS OF CURVATURE OF PROTRUSION-SHAPED LAND PORTION: RR/TR | 0.2 | 0.2 | 0.2 | 0.2 | 0.2 | 0.2 | 0.2 |
| PRESENCE OF BULGING INWARD OF BELT LAYER IN TIRE RADIAL DIRECTION | YES | YES | YES | YES | YES | YES | YES |
| Tg/Tc | 0.2 | 0.2 | 0.2 | 0.2 | 0.2 | 0.2 | 0.2 |
| MODULUS [MPa] OF 300% ELONGATION OF TREAD RUBBER LAYER | 18 | 13 | 13 | 13 | 13 | 13 | 13 |
| PRESENCE OF CIRCUMFERENTIAL NARROW GROOVE | NO | NO | YES | YES | YES | YES | YES |
| PRESENCE OF INWARD BULGING PORTION OF CARCASS LAYER | NO | NO | NO | YES | YES | YES | YES |
| PRESENCE OF BELT REINFORCING LAYER | NO | NO | NO | NO | YES | YES | YES |
| ARE LARGE NUMBER OF PIECES OF BELT REINFORCING LAYER LAYERED IN CENTER REGION? | - | - | - | - | POOR | GOOD | GOOD |
| PRESENCE OF SIDE REINFORCING RUBBER | NO | NO | NO | NO | NO | NO | YES |
| SHOCK BURST RESISTANCE | 107 | 113 | 114 | 115 | 116 | 117 | 118 |
| ROLLING RESISTANCE PERFORMANCE | 105 | 105 | 106 | 106 | 107 | 107 | 105 |

FIG. 11C

PNEUMATIC TIRE

FIELD OF THE TECHNOLOGY

The present technology relates to a pneumatic tire.

BACKGROUND OF THE TECHNOLOGY

Some known pneumatic tires have specified dimensions at predetermined positions to ensure desired performance. For example, a pneumatic tire described in Japan Patent No. 5567839 has a specified ratio between a tread width and the distance between an end portion of a belt layer and an outermost edge of a carcass to suppress diameter growth of a tread portion. Additionally, a run-flat radial tire described in Japan Unexamined Patent Publication No. 2015-205583 has a specified ratio between a tire cross-sectional height and an overlapping width in the tire axial direction between a maximum belt width layer and a side reinforcing rubber layer to prevent rim disengagement.

Here, in recent years, there has been an increasing need to increase a designated internal pressure to reduce tire rolling resistance. On the other hand, as the internal pressure of the pneumatic tire increases, the rigidity of a ground contact surface increases, making the ground contact surface less likely to deform in a case where a foreign material is treaded. This is likely to degrade shock burst resistance performance corresponding to resistance to a shock burst resulting from treading of the foreign material. Thus, reducing the rolling resistance without degrading the shock burst resistance performance has been very difficult.

SUMMARY

The present technology provides a pneumatic tire that can provide both shock burst resistance performance and reduced rolling resistance in a compatible manner.

A pneumatic tire is provided including at least one carcass layer, a belt layer disposed outward, in a tire radial direction, of a portion of the carcass layer located in the tread portion, and a tread rubber layer disposed outward, in the tire radial direction, of the belt layer in the tread portion, the tread portion being provided with a main groove extending in a tire circumferential direction, and a plurality of land portions defined by the main groove, and in the tread portion, assuming that a center region is a region where a center land portion included in the land portions and corresponding to the land portion closest to a tire equatorial plane is located, shoulder regions are each a region between a position corresponding to 85% of a width of the belt layer in a tire lateral direction and an end portion of the belt layer in the tire lateral direction, and intermediate regions are each a region between the center region and a corresponding one of the shoulder regions, a relationship between a tire average thickness Gc in the center region and a tire average thickness Gsh in the shoulder regions and a tire average thickness Gm in the intermediate regions being within a range of $1.05 \leq (Gc/Gsh) \leq 1.35$ and satisfying a relationship $Gc \geq Gm > Gsh$.

Additionally, preferably, in the pneumatic tire described above, in the tread portion, a relationship between an average thickness Tc of the tread rubber layer located outward, in the tire radial direction, from the belt layer in the center region, and an average thickness Tsh of the tread rubber layer located outward, in the tire radial direction, from the belt layer in the shoulder regions, and an average thickness Tm of the tread rubber layer located outward, in the tire radial direction, from the belt layer in the intermediate regions is within a range of $1.2 \leq (Tc/Tsh) \leq 1.9$ and satisfies a relationship $Tc \geq Tm > Ts$.

Additionally, preferably, in the pneumatic tire described above, in the tread portion, a relationship between an average actual rubber thickness Vc of the tread rubber layer in the center region and an average actual rubber thickness Vsh of the tread rubber layer in the shoulder regions is within a range of $1.6 \leq (Vc/Vsh) \leq 2.5$.

Additionally, preferably, in the pneumatic tire described above, at least one of the land portions located in the center region and the intermediate regions is formed as a projection-shaped land portion for which a relationship between a thickness Te at an end portion position of the land portion in the tire lateral direction and a thickness Tp at a central position of the land portion in the tire lateral direction is $Tp > Te$.

Additionally, preferably, in the pneumatic tire described above, the projection-shaped land portion is formed in an arc shape in which a ground contact surface representing an outer contour line in a tire meridian cross-sectional view bulges outward in the tire radial direction, and a relationship between a radius of curvature RR of the arc and a radius of curvature TR of an arc forming a tread profile is within a range of $0.1 \leq (RR/TR) \leq 0.4$.

Additionally, preferably, in the pneumatic tire described above, the belt layer bulges inward in the tire radial direction at a position located inward, in the tire radial direction, of the at least one of the land portions located in the center region and the intermediate regions.

Additionally, preferably, in the pneumatic tire described above, in the tread portion, a relationship between a minimum thickness Tg of a rubber thickness between the belt layer and a groove bottom of the main groove defining the center land portion and the average thickness Tc of the tread rubber layer located outward, in the tire radial direction, from the belt layer in the center region is within a range of $0.12 \leq (Tg/Tc) \leq 0.4$.

Additionally, preferably, in the pneumatic tire described above, a portion of rubber forming the tread rubber layer that is contained in the center region is 10 MPa or more and 16 MPa or less in modulus of 300% elongation.

Additionally, preferably, in the pneumatic tire described above, a circumferential narrow groove extending in the tire circumferential direction is formed in at least one of the shoulder regions located on opposite sides in the tire lateral direction.

Additionally, preferably, in the pneumatic tire described above, a portion of the carcass layer located in the shoulder region bulges toward a tire inner surface in an internal-pressure uninflated state.

Additionally, preferably, in the pneumatic tire described above, a belt reinforcing layer is disposed outward of the belt layer in the tire radial direction, and a larger number of pieces of the belt reinforcing layer are layered at a position of the center region than at positions other than the position of the center region.

A pneumatic tire according to an embodiment of the present technology produces the effect of enabling provision of both shock burst resistance performance and reduced rolling resistance in a compatible manner.

BRIEF DESCRIPTION OF THE DRAWINGS

FIG. 11A is a table showing the results of performance evaluation tests of pneumatic tires.

FIG. 11B is a table showing the results of performance evaluation tests of pneumatic tires.

FIG. 11C is a table showing the results of performance evaluation tests of pneumatic tires.

DETAILED DESCRIPTION

Pneumatic tires according to embodiments of the present technology are described in detail below with reference to the drawings. However, the present technology is not limited by the embodiment. Constituents of the following embodiments include elements that are substantially identical or that can be substituted and easily conceived by one skilled in the art.

First Embodiment

Hereinafter, "tire radial direction" refers to the direction orthogonal to the rotation axis (not illustrated) of a pneumatic tire 1. "Inward in the tire radial direction" refers to the direction toward the rotation axis in the tire radial direction. "Outward in the tire radial direction" refers to the direction away from the rotation axis in the tire radial direction. "Tire circumferential direction" refers to the circumferential direction with the rotation axis as the center axis. Additionally, "tire lateral direction" refers to a direction parallel with the rotation axis. "Inward in the tire lateral direction" refers to a direction toward a tire equatorial plane (tire equator line) CL in the tire lateral direction.

"Outward in the tire lateral direction" refers to a direction away from the tire equatorial plane CL in the tire lateral direction. "Tire equatorial plane CL" refers to a plane that is orthogonal to the rotation axis of the pneumatic tire 1 and that passes through the center of the tire width of the pneumatic tire 1. The position of the tire equatorial plane CL in the tire lateral direction coincides with a tire lateral direction center line corresponding to a central position of the pneumatic tire 1 in the tire lateral direction. "Tire width" is the width in the tire lateral direction between components located outermost in the tire lateral direction, or in other words, the distance between the components that are the most distant from the tire equatorial plane CL in the tire lateral direction. "Tire equator line" refers to the line in the tire circumferential direction of the pneumatic tire 1 that lies on the tire equatorial plane CL.

Figure 1:
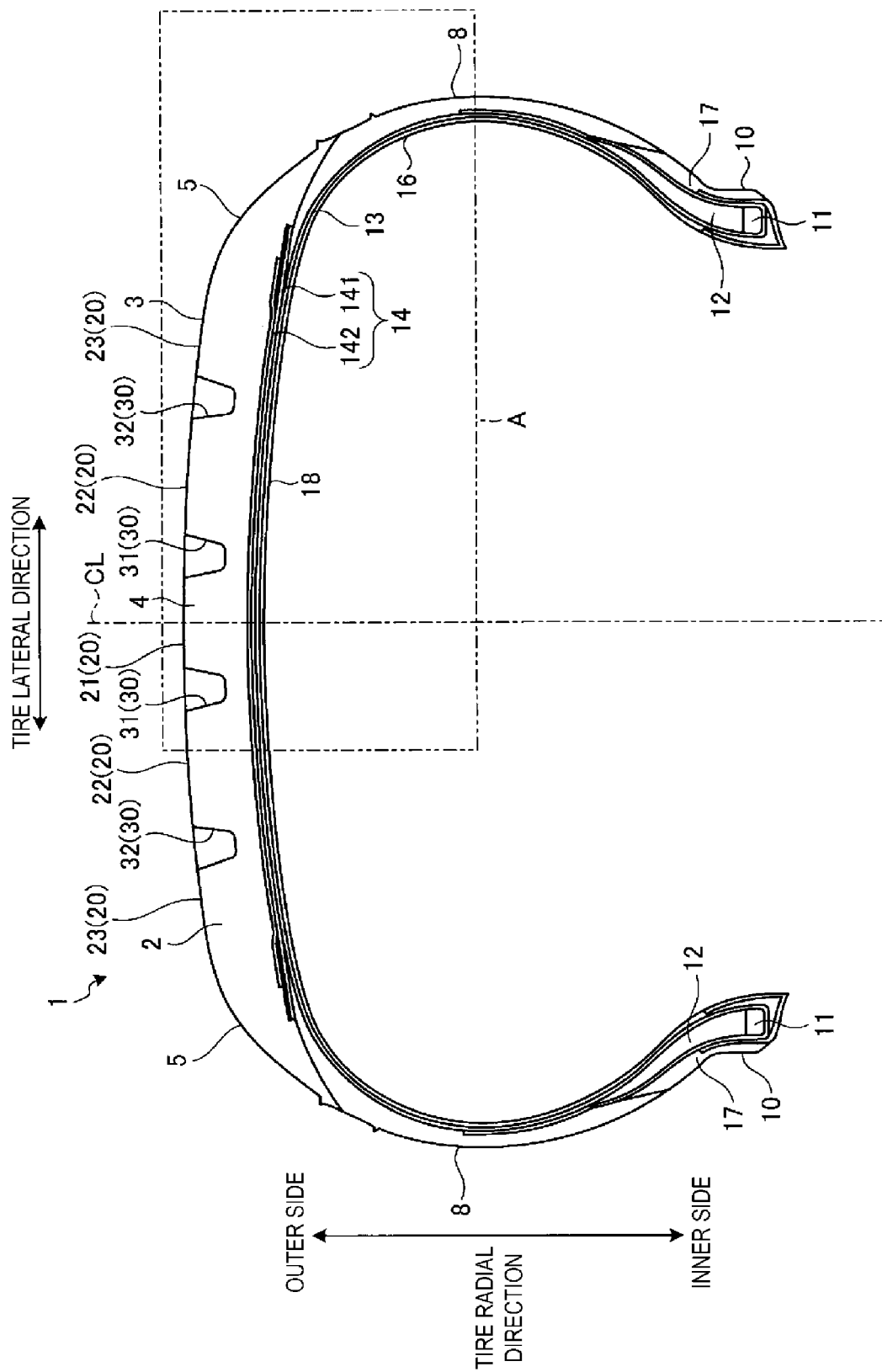
FIG. 1 is a meridian cross-sectional view illustrating a main portion of a pneumatic tire according to a first embodiment.

FIG. 1 is a meridian cross-sectional view illustrating a main portion of a pneumatic tire 1 according to a first embodiment. In the pneumatic tire 1 illustrated in FIG. 1, in a tire meridian cross-sectional view, a tread portion 2 is disposed in an outermost portion in the tire radial direction, and includes a tread rubber layer 4 formed of a rubber composition. Additionally, a surface of the tread portion 2, that is, a portion of the pneumatic tire that comes into contact with a road surface during traveling of a vehicle (not illustrated in the drawings) mounted with the pneumatic tire 1, is formed as a ground contact surface 3, which forms a part of contour of the pneumatic tire 1. The ground contact surface 3 of the tread portion 2 is provided with a plurality of main grooves 30 extending in the tire circumferential direction. The main grooves 30 define a plurality of land portions 20 in the surface of the tread portion 2. In the first embodiment, four main grooves 30 are formed side by side in the tire lateral direction, and two of the four main grooves 30 are disposed on each of opposite sides of the tire equatorial plane CL in the tire lateral direction. In other words, the tread portion 2 is provided with a total of four main grooves 30 including two center main grooves 31 disposed on the opposite sides of the tire equatorial plane CL and two shoulder main grooves 32 disposed outward, in the tire lateral direction, of each of the two center main grooves 31.

Note that "main groove 30" refers to a longitudinal groove that extends at least partially in the tire circumferential direction. In general, the main groove 30 has a groove width of 3 mm or more and a groove depth of 6 mm or more, and internally includes a tread wear indicator (skid sign) that indicates terminal stages of wear. In the first embodiment, the main groove 30 has a groove width of 9 mm or more and 12 mm or less and a groove depth of 7 mm or more and 8 mm or less, and is substantially parallel with the tire equator line (center line) where the tire equatorial plane CL and the ground contact surface 3 intersect. The main grooves 30 may extend linearly in the tire circumferential direction, or may be provided in a wave-like shape or a zigzag shape.

A center land portion 21 corresponds to the land portion 20 included in the land portions 20 defined by the main grooves 30 and located between the two center main grooves 31 and on the tire equatorial plane CL. Additionally, second land portions 22 each correspond to the land portion 20 located between the center main groove 31 and the shoulder main groove 32 that are adjacent to each other and disposed outward of the center land portion 21 in the tire lateral direction. Additionally, shoulder land portions 23 each correspond to the land portion 20 located outward of the second land portion 22 in the tire lateral direction and adjacent to the second land portion 22 via the shoulder main groove 32.

Additionally, shoulder portions 5 are located at both outer ends of the tread portion 2 in the tire lateral direction, and sidewall portions 8 are each disposed inward of the shoulder portion 5 in the tire radial direction. In other words, the sidewall portions 8 are disposed at two positions on the opposite sides of the pneumatic tire 1 in the tire lateral direction, and form outermost exposed portions of the pneumatic tire 1 in the tire lateral direction.

Bead portions 10 are each located inward, in the tire radial direction, of the corresponding one of the sidewall portions 8 located on the opposite sides in the tire lateral direction. Similar to the sidewall portions 8, the bead portions 10 are disposed at two positions on the opposite sides of the tire equatorial plane CL, that is, the bead portions 10 in a pair are disposed on opposite sides of the tire equatorial plane CL in the tire lateral direction. Each of the bead portions 10 is provided with a bead core 11, and a bead filler 12 is provided outward of the bead core 11 in the tire radial direction. The bead core 11 is an annular member formed by winding, in a ring shape, a bead wire including a steel wire, and the bead filler 12 is a rubber member disposed outward of the bead core 11 in the tire radial direction.

Additionally, a belt layer 14 is provided inward of the tread portion 2 in the tire radial direction. The belt layer 14 has a multilayer structure in which at least two cross belts 141 and 142 are layered. The cross belts 141 and 142 are formed by coating, with coating rubber, a plurality of belt cords made of steel or an organic fiber material such as polyester, rayon, or nylon, and performing a rolling process on the coating rubber-covered belt cords, and the cross belts 141 and 142 have a belt angle within a predetermined range (for example, of 20° or more and 55° or less), the belt angle being defined as the inclination angle of each belt cord with respect to the tire circumferential direction. Additionally, the two cross belts 141 and 142 are different from each other in belt angle. Thus, the belt layer 14 is what is called a crossply structure in which the two cross belts 141 and 142 are layered with the inclination directions of the belt cords intersecting each other. The tread rubber layer 4 of the tread portion 2 is disposed outward, in the tire radial direction, of the belt layer 14 in the tread portion 2.

A carcass layer 13 containing cords of radial plies is continuously provided inward of the belt layer 14 in the tire radial direction and in a portion of the sidewall portion 8 closer to the tire equatorial plane CL. The carcass layer 13 has a single layer structure made of one carcass ply or a multilayer structure made of a plurality of carcass plies, and extends between the pair of bead portions 10 on the opposite sides in the tire lateral direction in a toroidal form, forming the backbone of the tire. Specifically, the carcass layer 13 is disposed from one bead portion 10 to the other bead portion 10 located on either side in the tire lateral direction, and turns back outward in the tire lateral direction along the bead cores 11 at the bead portions 10, wrapping around the bead cores 11 and the bead fillers 12. The bead filler 12 is a rubber material disposed in a space formed outward of the bead core 11 in the tire radial direction by folding back the carcass layer 13 at the bead portion 10. Additionally, the belt layer 14 is disposed in the carcass layer 13 extending between the pair of bead portions 10 and outward, in the tire radial direction, of a portion of the carcass layer 13 located in the tread portion 2. Additionally, the carcass plies in the carcass layer 13 are made by coating, with coating rubber, a plurality of carcass cords made of steel or an organic fiber material such as nylon, polyester, or rayon and performing a rolling process on the coating rubber-covered carcass cords. A plurality of carcass cords forming carcass plies are disposed side by side forming a certain angle with respect to the tire circumferential direction along the tire meridian direction.

A rim cushion rubber 17 is disposed radially inward and laterally outward of the bead core 11 and turned back portion of the carcass layer 13 at the bead portion 10. The rim cushion rubber 17 is the contact surface of the bead portion 10 against the rim flange. Additionally, an innerliner 16 is formed inward of the carcass layer 13 or inward of the carcass layer 13 in the pneumatic tire 1, along the carcass layer 13. The innerliner 16 forms a tire inner surface 18 corresponding to an inner surface of the pneumatic tire 1.

Figure 2:
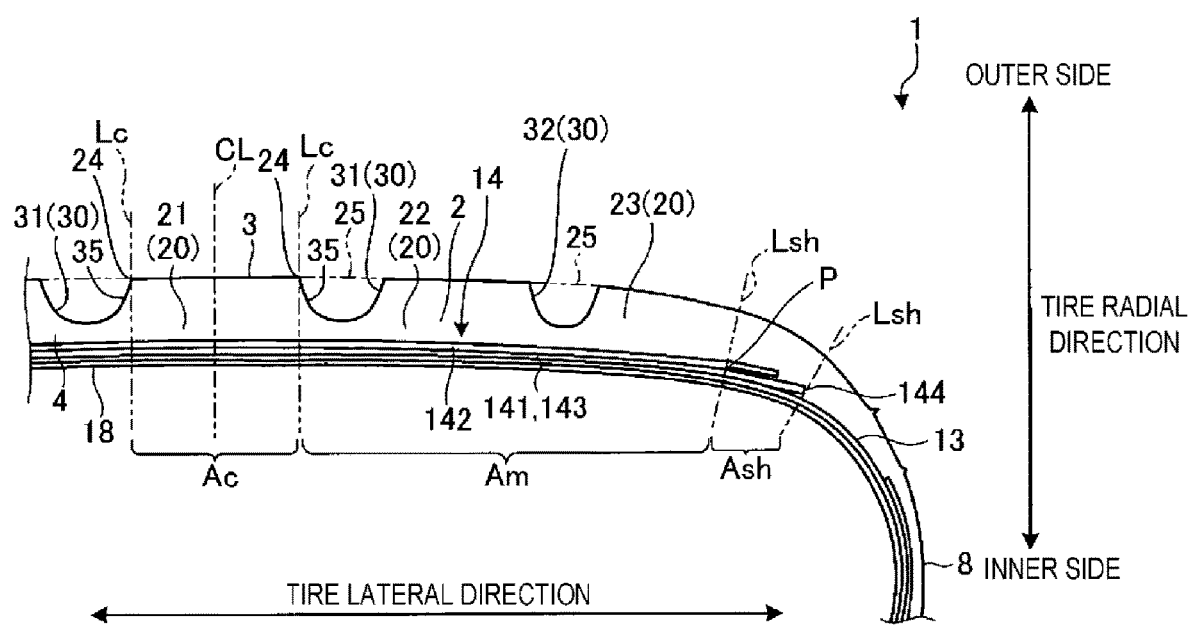
FIG. 2 is a detailed view of a portion A of FIG. 1.

FIG. 2 is a detailed view of a portion A of FIG. 1. Assuming that the tread portion 2 includes a center region Ac located in the center of the tread portion 2 in the tire lateral direction, shoulder regions Ash located at opposite ends of the tread portion 2 in the tire lateral direction, and intermediate regions Am each located between the center region Ac and the corresponding shoulder region Ash, a relative relationship between the tire average thicknesses of the respective regions satisfies a predetermined relationship. Among these regions, the center region Ac is a region where the center land portion 21 included in the land portions 20 and located closest to the tire equatorial plane CL is positioned. Specifically, in a meridian cross-sectional view of the pneumatic tire 1, assuming that center region boundary lines Lc are each a line extended perpendicularly to the tire inner surface 18 from an intersection point 24 between a portion of the groove wall 35 of the center main groove 31 defining the center land portion 21 which portion is located closer to the center land portion 21 and the ground contact surface 3 representing an outer contour line of the center land portion 21 located outward in the tire radial direction, the center region Ac corresponds to a region located between the two center region boundary lines Lc located on the opposite sides of the center land portion 21 in the tire lateral direction.

Note that when the center main groove 31 undulates in the tire lateral direction by bending or curving in the tire lateral direction while extending in the tire circumferential direction, the center region Ac is defined in the widest range in the tire lateral direction. In other words, in a case where the center main groove 31 undulates in the tire lateral direction, the center region boundary lines Lc defining the center region Ac each correspond to a line extended, perpendicularly to the tire inner surface 18, from the intersection point 24 between the ground contact surface 3 and a portion of the groove wall 35 of the center main groove 31 defining the center land portion 21 which portion is located outermost in the tire lateral direction on the tire circumferential direction.

Additionally, the shoulder region Ash is a region between a position P corresponding to 85% of the width of the belt layer 14 in the tire lateral direction and an end portion 144 of the belt layer 14 in the tire lateral direction. Specifically, in a meridian cross-section view of the pneumatic tire 1, assuming that shoulder region boundary lines Lsh correspond to lines extended, perpendicularly to the tire inner surface 18, from a position P corresponding to 85% of the width of a widest belt 143 included in the plurality of cross belts 141 and 142 of the belt layer 14 and from an end portion 144 of the widest belt 143, the shoulder region Ash corresponds to a region located between the two shoulder region boundary lines Lsh. The shoulder regions Ash defined as described above are defined by the opposite sides the tire equatorial plane CL in the tire lateral direction, and are located on the opposite sides of the tire equatorial plane CL in the tire lateral direction.

In the first embodiment, the cross belt 141 included in the two cross belts 141 and 142 of the belt layer 14 and located inward in the tire radial direction is larger than the other cross belt 142 in width in the tire lateral direction, and the cross belt 141 located inward in the tire radial direction corresponds to the widest belt 143.

Additionally, the position P corresponding to 85% of the width of the widest belt 143 in the tire lateral direction is the position of an end portion of a region accounting for 85% of the width of the widest belt 143 in the tire lateral direction in a case where the 85% region is evenly distributed on the opposite sides in the tire lateral direction with the center of the 85% region corresponding to the center of the widest belt 143 in the tire radial direction or the position of the tire equatorial plane CL. Thus, the spacing between the position P corresponding to 85% of the width of the widest belt 143 in the tire lateral direction and the end portion 144 of the widest belt 143 is the same on the opposite sides of the tire equatorial plane CL in the tire lateral direction.

Additionally, the intermediate region Am is a region between the center region Ac and the shoulder region Ash. In other words, the intermediate region Am is located on both sides of the center region Ac in the tire lateral direction, the boundary of the intermediate region Am located inward in the tire lateral direction is defined by the center region boundary line Lc, and the boundary of the intermediate region Am located outward in the tire lateral direction is defined by the shoulder region boundary line Lsh.

The center region Ac, the shoulder regions Ash, and the intermediate regions Am are specified to have shapes obtained with the pneumatic tire 1 mounted on a regular rim and inflated to a regular internal pressure. Here, "regular rim" refers to a "standard rim" defined by JATMA (Japan Automobile Tyre Manufacturers Association, Inc.), a "Design Rim" defined by TRA (The Tire and Rim Association, Inc.), or a "Measuring Rim" defined by ETRTO (European Tire and Rim Technical Organization). "Regular internal pressure" refers to a "maximum air pressure" defined by JATMA, the maximum value in "TIRE LOAD LIMITS AT VARIOUS COLD INFLATION PRESSURES" defined by TRA, or "INFLATION PRESSURES" defined by ETRTO.

In the tread portion 2, a relative relationship between the tire average thicknesses in the center region Ac and the shoulder regions Ash and the intermediate regions Am satisfies a predetermined relationship. In this case, the tire average thickness is the average value, for each region, of the tire thickness, which is a thickness from the ground contact surface 3 to the tire inner surface 18, the ground contact surface 3 representing an outer contour line corresponding to an outer contour line of the land portion 20 in the tire radial direction in a tire meridian cross-sectional view. In other words, the tire average thickness Gc in the center region Ac is the average value of the distance from the ground contact surface 3 to the tire inner surface 18 in the center region Ac, and the tire average thickness Gsh in the shoulder regions Ash is the average value of the distance from the ground contact surface 3 to the tire inner surface 18 in the shoulder regions Ash, and the tire average thickness Gm in the intermediate regions Am is the average value of the distance from the ground contact surface 3 to the tire inner surface 18 in the intermediate regions Am.

Although the center main groove 31 and the shoulder main groove 32 are located in the intermediate regions Am of the tread portion 2, the tire average thickness Gm in the intermediate regions Am is calculated on the assumption that these main grooves 30 are not present. In other words, for the tire thickness at the position of the main groove 30, the tire average thickness Gm in the intermediate regions Am is calculated with a distance from an imaginary line 25 to the tire inner surface 18 considered as the tire thickness at the position of the main groove 30, the imaginary line 25 being obtained by extending the ground contact surface 3 of the land portions 20 on the opposite sides of the main groove 30 in the tire lateral direction.

The tire average thickness of each of the regions may be calculated, for each of the center region Ac, the shoulder regions Ash, and the intermediate regions Am of the tread portion 2 in the meridian cross-section of the pneumatic tire 1, by dividing the cross-sectional area of the region by the width of the region. For example, the tire average thickness Gc of the center region Ac is calculated by dividing the cross-sectional area of the center region Ac by the distance between two center region boundary lines Lc defining the center region Ac. In a case where the two center region boundary lines Lc are inclined with respect to each other, the tire average thickness Gc of the center region Ac is calculated by dividing the cross-sectional area of the center region Ac by the distance at an intermediate position between the position of the ground contact surface 3 and the position of the tire inner surface 18 on each center region boundary line Lc. The tire average thickness Gsh in the shoulder regions Ash and the tire average thickness Gm in the intermediate regions Am are similarly calculated by dividing the cross-sectional area of each of the regions by the distance between the shoulder region boundary lines Lsh defining the region or the distance between the center region boundary line Lc and the shoulder region boundary line Lsh.

In the tread portion 2, a relationship between the tire average thickness Gc in the center region Ac and the tire average thickness Gsh in the shoulder regions Ash calculated as described above is within a range of $1.05 \leq (Gc/Gsh) \leq 1.35$. Furthermore, in the tread portion 2, the tire average thickness Gc in the center region Ac, the tire average thickness Gsh in the shoulder regions Ash, and the tire average thickness Gm in the intermediate regions Am satisfies a relationship $Gc \geq Gm > Gsh$. Note that the relationship between the tire average thickness Gc in the center region Ac and the tire average thickness Gsh in the shoulder regions Ash is preferably within a range of $1.08 \leq (Gc/Gsh) \leq 1.20$.

Figure 3:
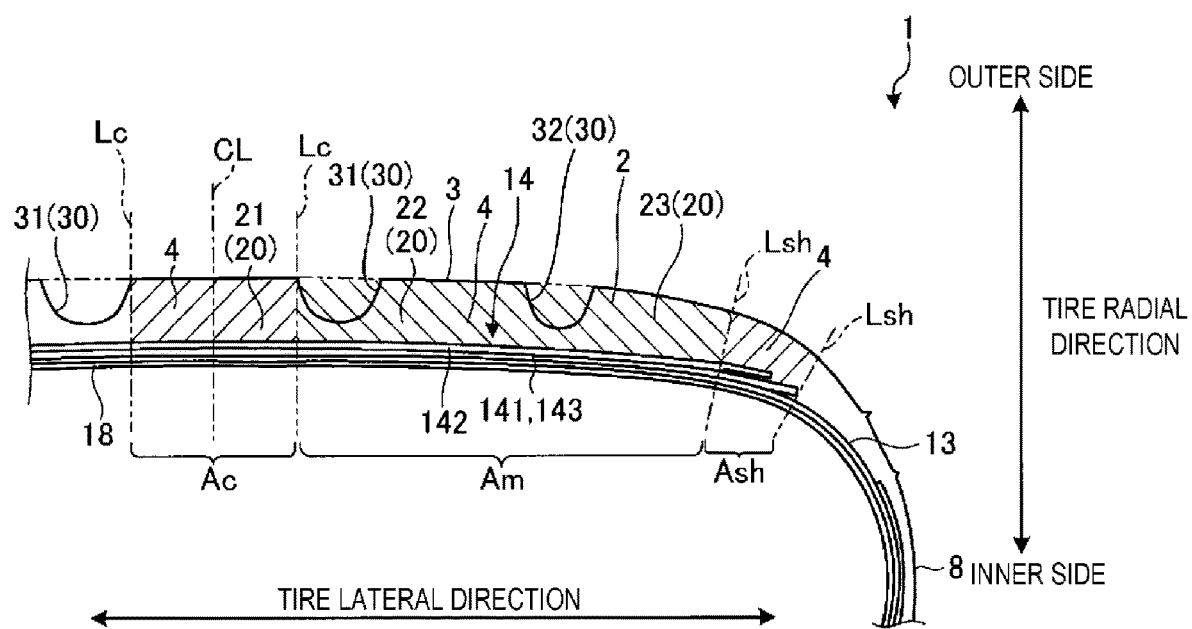
FIG. 3 is an explanatory diagram of the thickness of a tread rubber layer.

FIG. 3 is an explanatory diagram of the thickness of the tread rubber layer 4. In the tread portion 2, not only the tire average thickness for each region, but also the relative relationship between the thicknesses of the tread rubber layer 4 at the respective regions satisfies the predetermined relationship. In other words, in the tread portion 2, a relationship between the average thickness Tc of the tread rubber layer 4 located outward, in the tire radial direction, from the belt layer 14 in the center region Ac and the average thickness Tsh of the tread rubber layer 4 located outward, in the tire radial direction, from the belt layer 14 in the shoulder regions Ash is within a range of $1.2 \leq (Tc/Tsh) \leq 1.9$. Furthermore, in the tread portion 2, for the average thickness Tc of the tread rubber layer 4 located outward, in the tire radial direction, from the belt layer 14 in the center region Ac, the average thickness Tsh of the tread rubber layer 4 located outward, in the tire radial direction, from the belt layer 14 in the shoulder regions Ash, and the average thickness Tm of the tread rubber layer 4 located outward, in the tire radial direction, from the belt layer 14 in the intermediate regions Am, a relationship $Tc \geq Tm > Ts$ is satisfied. Note that, in FIG. 3, the tread rubber layer 4 in each of the regions is hatched. Additionally, a relationship between the average thickness Tc of the tread rubber layer 4 in the center region Ac and the average thickness Tsh of the tread rubber layer 4 in the shoulder regions Ash is preferably within a range of $1.4 \leq (Tc/Tsh) \leq 1.7$.

The average thickness of the tread rubber layer 4 in each of the regions in this case is the average thickness in each region obtained on the assumption that the thickness of the tread rubber layer 4 is defined as the distance between the ground contact surface 3 and the cross belt 142 included in the cross belts 141 and 142 of the belt layer 14 and located outward in the tire radial direction. Additionally, the average thickness Tm of the tread rubber layer 4 in the intermediate regions Am is calculated, similarly to the tire average thickness Gm in the intermediate regions Am, on the assumption that the main grooves 30 are not present. In other words, for the thickness of the tread rubber layer 4 at the position of the main groove 30, the average thickness Tm of the tread rubber layer 4 in the intermediate regions Am is calculated with a distance from the imaginary line 25 to the cross belt 142 considered as the thickness of the tread rubber layer 4 at the position of the main groove 30, the imaginary line 25 being obtained by extending the ground contact surface 3 of the land portions 20 on the opposite sides of the main groove 30 in the tire lateral direction, the cross belt 142 being included in the two cross belts 141 and 142 and located outward in the tire radial direction.

Like the tire average thickness, the thickness of the tread rubber layer 4 defined as described above may be calculated, for each of the center region Ac, the shoulder regions Ash, and the intermediate regions Am of the tread portion 2 in the meridian cross-section of the pneumatic tire 1, by dividing the cross-sectional area of the tread rubber layer 4 in the region by the width of the region.

In addition, at least a portion of the rubber forming the tread rubber layer 4 that is contained in the center region Ac is 10 MPa or more and 16 MPa or less in modulus of 300% elongation. Note that the modulus of 300% elongation is measured in a tensile test at 23° C. in conformance with JIS (Japanese Industrial Standard) K6251 (using dumbbell No. 3) and indicates tensile stress at 300% elongation.

Figure 4:
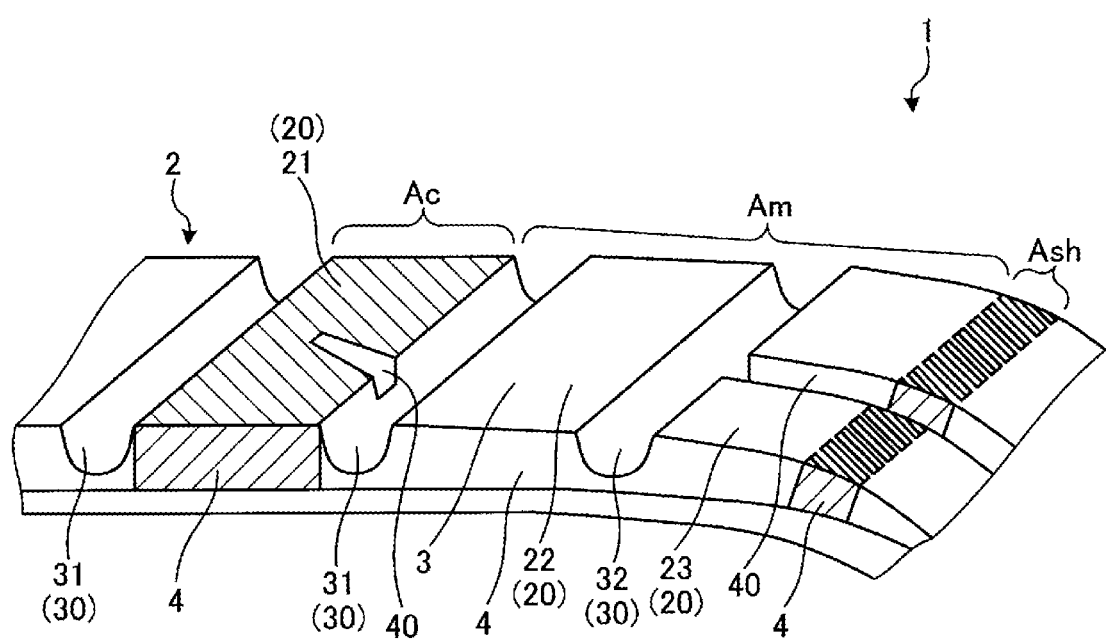
FIG. 4 is a perspective view of a main portion of a tread portion and is an explanatory diagram illustrating the actual rubber thickness of a tread rubber layer.

Furthermore, in the tread portion 2, for an actual rubber thickness corresponding to the thickness of the tread rubber layer 4 obtained taking into account the grooves formed in the tread portion 2, the relative relationship between the regions satisfies a predetermined relationship. In other words, for an average actual rubber thickness corresponding to the actual rubber thickness calculated for each region, the relative relationship between the regions satisfies a predetermined relationship. FIG. 4 is a perspective view of a main portion of the tread portion 2, and is an explanatory diagram of the actual rubber thickness of the tread rubber layer 4. The main grooves 30 are formed in the tread portion 2, and besides the main grooves 30, extending in the tire circumferential direction, grooves such as lug grooves 40 that extend in the tire lateral direction are formed. The average thickness of the tread rubber layer 4 described above is the thickness of the tread rubber layer 4 calculated with no consideration of these grooves and on the assumption that no grooves are present, whereas the average actual rubber thickness of the tread rubber layer 4 is the thickness of the tread rubber layer 4 calculated on the assumption that no rubber forming the tread rubber layer 4 is present in the groove portions. Thus, the average actual rubber thickness of the tread rubber layer 4 in each of the regions is a thickness calculated by dividing the actual volume of the tread rubber layer 4 in each region excluding the grooves such as the main grooves 30 and the lug grooves 40 by the area of a portion of the tire inner surface 18 located in each of the regions.

For example, the average actual rubber thickness Vc of the tread rubber layer 4 in the center region Ac is calculated by dividing the volume of the tread rubber layer 4 in the center region Ac excluding the grooves by the area of a portion of the tire inner surface 18 located in the center region Ac. The area of the portion of the tire inner surface 18 located in the center region Ac corresponds to the area of a portion of the tire inner surface 18 that extends in the tire circumferential direction between the two center region boundary lines Lc defining the center region Ac.

Additionally, the average actual rubber thickness Vsh of the tread rubber layer 4 in the shoulder region Ash is calculated by dividing the volume of the tread rubber layer 4 in the shoulder region Ash excluding the grooves by the area of a portion of the tire inner surface 18 located in the shoulder region Ash. The area of the portion of the tire inner surface 18 located in the shoulder region Ash corresponds to the area of a portion of the tire inner surface 18 that extends in the tire circumferential direction between two shoulder region boundary lines Lsh defining the shoulder region Ash.

In the tread portion 2, a relationship between the average actual rubber thickness Vc of the tread rubber layer 4 in the center region Ac and the average actual rubber thickness Vsh of the tread rubber layer 4 in the shoulder regions Ash calculated as described above is within a range of $1.6 \leq (Vc/Vsh) \leq 2.5$.

Note that the average actual rubber thickness of the tread rubber layer 4 in each of the regions may be calculated by cutting out the tread rubber layer 4 from the pneumatic tire 1 for each of the regions, calculating the volume based on the mass of a cutout tread rubber layer 4 and the specific gravity of the rubber forming the tread rubber layer 4, and dividing the calculated volume by the area of a portion of the tire inner surface 18 located in the region.

When mounted on a vehicle, the pneumatic tire 1 according to the first embodiment is mounted on a rim wheel R (see FIG. 5) by fitting the rim wheel R to the bead portion 10, and is inflated by filling the inside with air before the mounting on the vehicle. The pneumatic tire 1 according to the first embodiment is used in a state in which the internal pressure during inflation is relatively high, and specifically, is used at an internal pressure of 250 kPa or more and 290 kPa or less. When a vehicle equipped with the pneumatic tire 1 travels, the pneumatic tire 1 rotates with a portion of the ground contact surface 3 located below coming into contact with the road surface. The vehicle travels by transferring a driving force and a braking force to the road surface or generating a turning force due to the frictional force between the ground contact surface 3 and the road surface.

For example, in a case of traveling on a dry road surface, a vehicle equipped with the pneumatic tire 1 travels by transferring a driving force and a braking force to the road surface or generating a turning force mainly due to the frictional force between the ground contact surface 3 and the road surface. Additionally, during traveling on a wet road surface, water between the ground contact surface 3 and the road surface enters the grooves such as the main grooves 30 and the lug groove 40 and is drained by these grooves. Accordingly, the ground contact surface 3 comes into easy contact with the road surface, and the friction force between the ground contact surface 3 and the road surface allows the vehicle to travel as desired.

Additionally, while the vehicle is traveling, the pneumatic tire 1 is subjected to a load associated with the weight of the vehicle body, acceleration and deceleration, and turning, leading to a heavy load acting in the tire radial direction. The load is mainly borne by the air with which the pneumatic tire 1 is filled, but is received not only by the air inside the pneumatic tire 1 but also by the tread portion 2 and the sidewall portion 8. Specifically, the sidewall portion 8 transfers a load between the bead portion 10 to which the rim wheel R is fitted and the tread portion 2, and the tread portion 2 transfers a load between the sidewall portion 8 and the road surface. Thus, a heavy load acts on the sidewall portion 8 and the tread portion 2 while the vehicle is traveling, and the sidewall portion 8 and the tread portion 2 receive the load while bending mainly in the tire radial direction.

Additionally, while the vehicle is traveling, the pneumatic tire 1 rotates, and thus the position of the ground contact surface 3 that comes into contact with the road surface continuously moves in the tire circumferential direction.

Consequently, positions on the sidewall portion 8 and the tread portion 2 that are deflected by the load while the vehicle is traveling also move in the tire circumferential direction. Thus, while the vehicle is traveling, the pneumatic tire 1 rotates with the positions on the sidewall portion 8 and the tread portion 2 in the tire circumferential direction sequentially repeatedly deflected.

Here, the deflection of the sidewall portion 8 and the tread portion 2 in this manner prevents rotation of the pneumatic tire 1 in contact with the road surface, and acts as strong resistance during rotation of the pneumatic tire 1. Thus, significant deflection of the pneumatic tire 1 during rotation of the pneumatic tire 1 increases what is called rolling resistance, corresponding to the resistance during rotation of the pneumatic tire 1.

In contrast, the pneumatic tire 1 according to the first embodiment is used under an internal pressure of 250 kPa or more and 290 kPa or less, that is, the pneumatic tire 1 is used under a relatively high internal pressure. Accordingly, much of the load acting on the pneumatic tire 1 can be received by the internal pressure. Thus, the sidewall portion 8 and the tread portion 2 are less likely to be deflected by the load acting on the pneumatic tire 1, and the resistance during rotation of the pneumatic tire 1 can be reduced that is caused by the deflection of the sidewall portion 8 and the tread portion 2. This enables a reduction in rolling resistance during rotation of the pneumatic tire 1.

Additionally, on the road surface on which the vehicle travels, projections such as stones that project from the road surface may be present, and while the vehicle is traveling, the tread portion 2 of the pneumatic tire 1 may tread such a projection. At this time, in a case where the sidewall portion 8 and the tread portion 2 are insignificantly deflected due to the high internal pressure, the pneumatic tire 1 fails to absorb a change in the shape of the road surface caused by the presence of the projection, and the projection may penetrate the tread portion 2 of the pneumatic tire 1. In other words, in a case where the pneumatic tire 1 inflated to a high internal pressure treads the projection on the road surface, the projection may penetrate the tread portion 2 due to the insignificant deflection of the sidewall portion 8 and the tread portion 2, leading to a shock burst.

Figure 5:
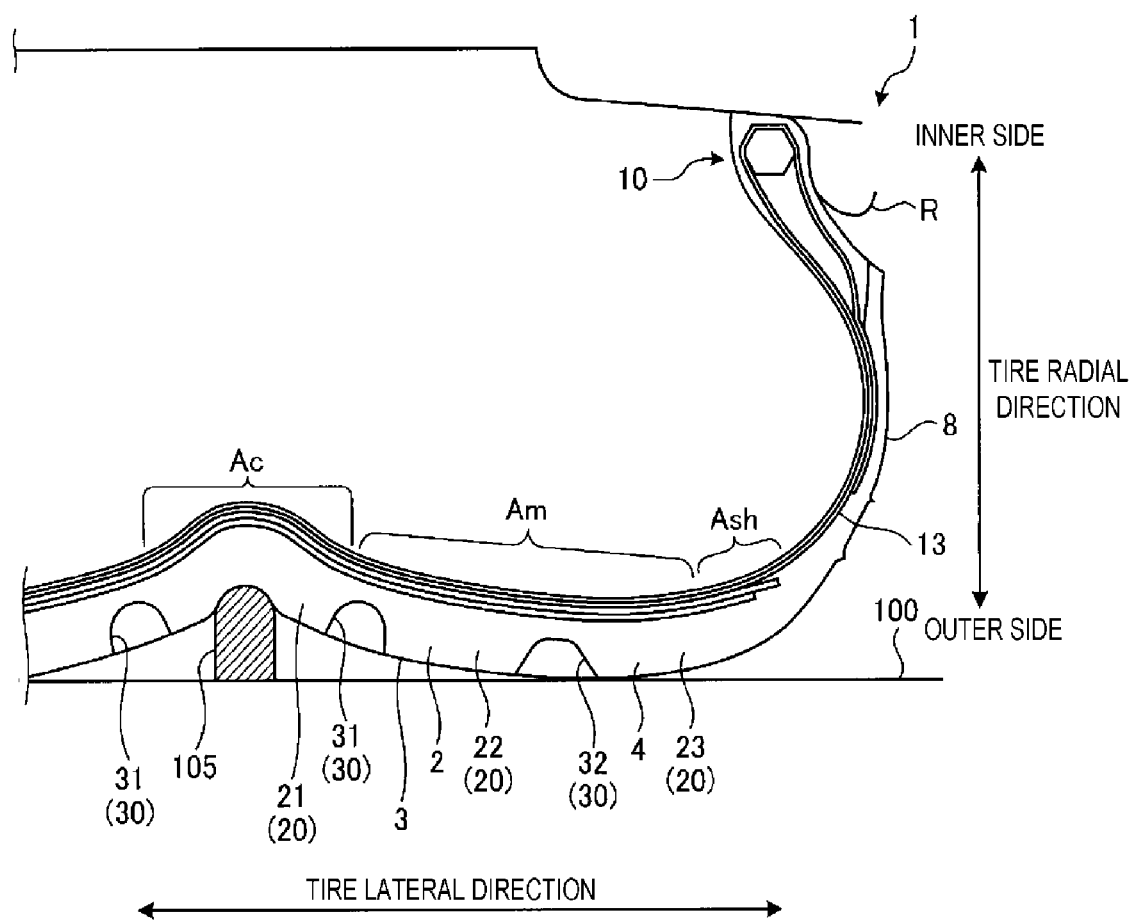
FIG. 5 is an explanatory diagram illustrating that a projection on a road surface is treaded by the pneumatic tire according to the first embodiment.

In contrast, the pneumatic tire 1 according to the first embodiment has an increased tire average thickness Gc in the center region Ac and a reduced tire average thickness Gsh in the shoulder regions Ash, allowing a possible shock burst to be suppressed in a case of an increased internal pressure. FIG. 5 is an explanatory diagram illustrating that a projection 105 on a road surface 100 is treaded by the pneumatic tire 1 according to the first embodiment. The pneumatic tire 1 according to the first embodiment has an increased tire average thickness Gc in the center region Ac to enable an increase in strength at break at or near the center of the tread portion 2 in the tire lateral direction. Thus, even in a case where the pneumatic tire 1 treads the projection 105 on the road surface 100 at or near the center region Ac, penetration of the tread portion 2 by the projection 105 can be suppressed. Additionally, a reduced tire average thickness Gsh in the shoulder regions Ash allows the shoulder regions Ash to deform preferentially in a case where the projection 105 is treaded by the vicinity of the center region Ac of the tread portion 2, allowing the shoulder regions Ash to deform easily in the direction in which the vicinity of the center region Ac is separated from the road surface 100. Accordingly, the pressure from the projection 105 acting on the tread portion 2 can be reduced, allowing suppression of penetration the projection 105 by the tread portion 2. Thus, a possible shock burst can be suppressed that is caused by treading of the projection 105 during traveling of the vehicle.

Specifically, in the tread portion 2 of the pneumatic tire 1 according to the first embodiment, the relationship between the tire average thickness Gc in the center region Ac and the tire average thickness Gsh in the shoulder regions Ash is within the range of $1.05 \leq (Gc/Gsh) \leq 1.35$. Thus, with the rolling resistance reduced, a possible shock burst can be suppressed. In other words, in a case where the relationship between the tire average thickness Gc in the center region Ac and the tire average thickness Gsh in the shoulder regions Ash is $(Gc/Gsh) < 1.05$, the tire average thickness Gc in the center region Ac is excessively small, hindering the strength at break of the center region Ac from being increased. Alternatively, the tire average thickness Gsh in the shoulder regions Ash is excessively large, making the shoulder regions Ash less likely to deform. In a case where the projection 105 is treaded by the tread portion 2, the shoulder regions Ash are less likely to deform in the direction in which the vicinity of the center region Ac is separated from the road surface 100.

Additionally, in a case where the relationship between the tire average thickness Gc in the center region Ac and the tire average thickness Gsh in the shoulder regions Ash is $(Gc/Gsh) > 1.35$, the tire average thickness Gc in the center region Ac is excessively large and the tire average thickness Gsh in the shoulder regions Ash is excessively small, leading to a significant difference in contact length between the central region and both end regions of the contact patch shape of the ground contact surface 3 in the tire lateral direction. This makes the rolling resistance more likely to increase. In other words, a contact patch shape having a large ground contact length near the center in the tire lateral direction and a small contact length near both ends in the tire lateral direction means that the deflection of the tread portion 2 differs between the central region and both end regions in the tire lateral direction. The deflection is more significant in the central region than in both end regions. Accordingly, the deflection of the tread portion 2 occurring in a case where the ground contact surface 3 comes into contact with the ground concentrates in the central region of the tread portion 2 in the tire lateral direction, and only this portion is significantly deflected. Thus, the significant deflection of the central region of the tread portion 2 in the tire lateral direction makes the rolling resistance likely to increase.

In contrast, in a case where the relationship between the tire average thickness Gc in the center region Ac and the tire average thickness Gsh in the shoulder regions Ash is within the range of $1.05 \leq (Gc/Gsh) \leq 1.35$, then with the significant deflection of only the central region of the tread portion 2 in the tire lateral direction suppressed, the strength at break of the center region Ac can be ensured and easiness of deformation of the shoulder regions Ash can be ensured, in a case where the ground contact surface 3 comes into contact with the ground. Accordingly, with the rolling resistance reduced, a possible shock burst can be suppressed, allowing shock burst resistance performance to be improved.

Furthermore, in the tread portion 2, the tire average thickness Gc in the center region Ac, the tire average thickness Gsh in the shoulder regions Ash, and the tire average thickness Gm in the intermediate regions Am satisfy the relationship $Gc \geq Gm > Gsh$. Thus, the tire thickness of the tread portion 2 can be continuously varied from the center region Ac to the intermediate region Am and the shoulder region Ash. Accordingly, the out-of-plane bending rigidity of the tread portion 2 can be continuously varied along the tire lateral direction. Thus, stress concentration that is caused by deflection of the tread portion 2 associated with treading of the projection 105 by the tread portion 2 can be suppressed. Additionally, the tire average thickness Gsh is smallest in the shoulder regions Ash, which are subjected to a heavy energy loss during rotation of the pneumatic tire 1 due to relatively significant deflection in a case where the ground contact surface 3 comes into contact with the ground. This enables a reduction in resistance offered in a case where the shoulder regions Ash are deflected. Thus, the energy loss during rotation of the pneumatic tire 1 can be reduced, enabling a reduction in rolling resistance. As a result, both shock burst resistance performance and reduced rolling resistance can be provided in a compatible manner.

Additionally, in the tread portion 2, the relationship between the average thickness Tc of the tread rubber layer 4 in the center region Ac and the average thickness Tsh of the tread rubber layer 4 in the shoulder regions Ash is within the range of 1.2≤(Tc/Tsh)≤1.9. Thus, with the rolling resistance reduced, a possible shock burst can be suppressed. In other words, if the relationship between the average thickness Tc of the tread rubber layer 4 in the center region Ac and the average thickness Tsh of the tread rubber layer 4 in the shoulder region Ash is (Tc/Tsh)<1.2, the average thickness Tc of the tread rubber layer 4 in the center region Ac is too thin, so there is a risk that the strength at break of the center region Ac will be difficult to increase. In another case, because the average thickness Tsh of the tread rubber layer 4 in the shoulder region Ash is too thick, there is a risk that the shoulder regions Ash are less likely to deform when the projections 105 are treaded. Additionally, in a case where the relationship between the average thickness Tc of the tread rubber layer 4 in the center region Ac and the average thickness Tsh of the tread rubber layer 4 in the shoulder regions Ash is (Tc/Tsh)>1.9, the average thickness Tc of the tread rubber layer 4 in the center region Ac is excessively large, and the average thickness Tsh of the tread rubber layer 4 in the shoulder regions Ash is excessively small. The central region of the contact patch shape of the ground contact surface 3 in the tire lateral direction has a substantially larger contact length than both end regions of the contact patch shape of the ground contact surface 3 in the tire lateral direction. In this case, in a case where the ground contact surface 3 comes into contact with the ground, only the central region of the tread portion 2 in the tire lateral direction is likely to deflect significantly, and this may be likely to increase the rolling resistance.

In contrast, in a case where the relationship between the average thickness Tc of the tread rubber layer 4 in the center region Ac and the average thickness Tsh of the tread rubber layer 4 in the shoulder regions Ash is within the range of 1.2≤(Tc/Tsh)≤1.9, then with the significant deflection of only the central region of the tread portion 2 in the tire lateral direction suppressed, the strength at break of the center region Ac can be ensured and easiness of deformation of the shoulder regions Ash can be ensured, in a case where the ground contact surface 3 comes into contact with the ground. Accordingly, with the rolling resistance reduced, a possible shock burst can be suppressed, allowing shock burst resistance performance to be improved.

Furthermore, in the tread portion 2, the average thickness Tc of the tread rubber layer 4 in the center region Ac, and the average thickness Tsh of the tread rubber layer 4 in the shoulder regions Ash, and the average thickness Tm of the tread rubber layer 4 in the intermediate region Am satisfy the relationship Tc≥Tm>Ts. Thus, the thickness of the tread rubber layer 4 can be continuously varied from the center region Ac to the intermediate region Am and the shoulder region Ash. Accordingly, the out-of-plane bending rigidity of the tread portion 2 can be more reliably continuously varied along the tire lateral direction, and stress concentration can be more reliably suppressed that is caused by deflection of the tread portion 2 associated with treading of the projection 105 by the tread portion 2. Additionally, the average thickness Tsh of the tread rubber layer 4 in the shoulder regions Ash is smallest, and thus the resistance offered in a case where the shoulder regions Ash are deflected can be more reliably reduced. Accordingly, energy loss during rotation of the pneumatic tire 1 can be reduced, enabling a reduction in rolling resistance. As a result, both shock burst resistance performance and reduced rolling resistance can be more reliably provided in a compatible manner.

Additionally, in the tread portion 2, the relationship between the average actual rubber thickness Vc of the tread rubber layer 4 in the center region Ac and the average actual rubber thickness Vsh of the tread rubber layer 4 in the shoulder regions Ash is within the range of 1.6≤(Vc/Vsh)≤2.5. Thus, with the rolling resistance reduced, a possible shock burst can be suppressed. In other words, in a case where the relationship between the average actual rubber thickness Vc of the tread rubber layer 4 in the center region Ac and the average actual rubber thickness Vsh of the tread rubber layer 4 in the shoulder regions Ash is (Vc/Vsh)<1.6, the average actual rubber thickness Vc of the tread rubber layer 4 in the center region Ac is excessively small. This may lead to difficulty in increasing the strength at break of the center region Ac. In another case, an excessively large average actual rubber thickness Vsh of the tread rubber layer 4 in the shoulder regions Ash may make the shoulder regions Ash less likely to deform in a case where the projection 105 is treaded. Additionally, in a case where the relationship between the average actual rubber thickness Vc of the tread rubber layer 4 in the center region Ac and the average actual rubber thickness Vsh of the tread rubber layer 4 of the shoulder region Ash is (Vc/Vsh)>2.5, the average actual rubber thickness Vc of the tread rubber layer 4 in the center region Ac is too thick, and the average actual rubber thickness Vsh of the tread rubber layer 4 in the shoulder region Ash is too thin. Accordingly, there is a risk that the ground contact length at or near the center of the ground contact surface 3 in the tire lateral direction may be significantly longer than the ground contact length at or near both ends in the tire lateral direction. In this case, at the time of contact with the ground contact surface 3, only the central region of the tread portion 2 in the tire lateral direction is likely to deflect significantly, and this may be likely to increase the rolling resistance.

In contrast, in a case where the relationship between the average actual rubber thickness Vc of the tread rubber layer 4 in the center region Ac and the average actual rubber thickness Vsh of the tread rubber layer 4 in the shoulder regions Ash is within the range of 1.6≤(Vc/Vsh)≤2.5, then with the significant deflection of only the central region of the tread portion 2 in the tire lateral direction suppressed, the strength at break of the center region Ac can be ensured and easiness of deformation of the shoulder regions Ash can be ensured, in a case where the ground contact surface 3 comes into contact with the ground. As a result, both shock burst resistance performance and reduced rolling resistance can be more reliably provided in a compatible manner.

In addition, a portion of the rubber forming the tread rubber layer 4 that is contained at least in the center region Ac is 10 MPa or more and 16 MPa or less in modulus of 300% elongation. Thus, with the strength of the tread rubber layer 4 ensured, the tread portion 2 can be appropriately deflected. In other words, in a case where the rubber contained in the center region Ac in the tread rubber layer 4 is less than 10 MPa in modulus of 300% elongation, a portion of the rubber located in the center region Ac of the tread rubber layer 4 may be excessively soft. In a case where the projection 105 is treaded by the central region of the tread portion 2 in the tire lateral direction, the projection 105 may penetrate the tread rubber layer 4. In this case, the projection 105 penetrating the tread rubber layer 4 may reach the belt layer 14 and damage the belt layer 14. Additionally, in a case where the rubber contained in the center region Ac in the tread rubber layer 4 is more than 16 MPa in modulus of 300% elongation, the tread portion 2 may be excessively difficult to deflect in a case where the projection 105 is treaded by the tread portion 2. The protrusion of the projection 105 from the road surface 100 may be prevented from being absorbed by deflection of the tread portion 2. In this case, even with the high strength of the tread rubber layer 4, the projection 105 may penetrate the tread rubber layer 4 and damage the belt layer 14.

In contrast, in a case where the rubber contained in the center region Ac in the tread rubber layer 4 is 10 MPa or more and 16 MPa or less in modulus of 300% elongation, then with the tread rubber layer 4 provided with a strength sufficient to allow suppression of penetration of the projection 105, the tread portion 2 can be appropriately deflected to allow the protrusion of the projection 105 from the road surface 100 to be absorbed to some degree in a case where the projection 105 is treaded by the tread portion 2. As a result, the shock burst resistance performance can be more reliably improved.

Second Embodiment

The pneumatic tire 1 according to a second embodiment has a configuration substantially similar to the configuration of the pneumatic tire 1 according to the first embodiment. However, the pneumatic tire 1 according to the second embodiment has the feature that at least one land portion 20 is formed as a protrusion-shaped land portion 26. The other components are similar to the corresponding components of the first embodiment, and thus description of the components is omitted and the same reference numerals are used.

Figure 6:
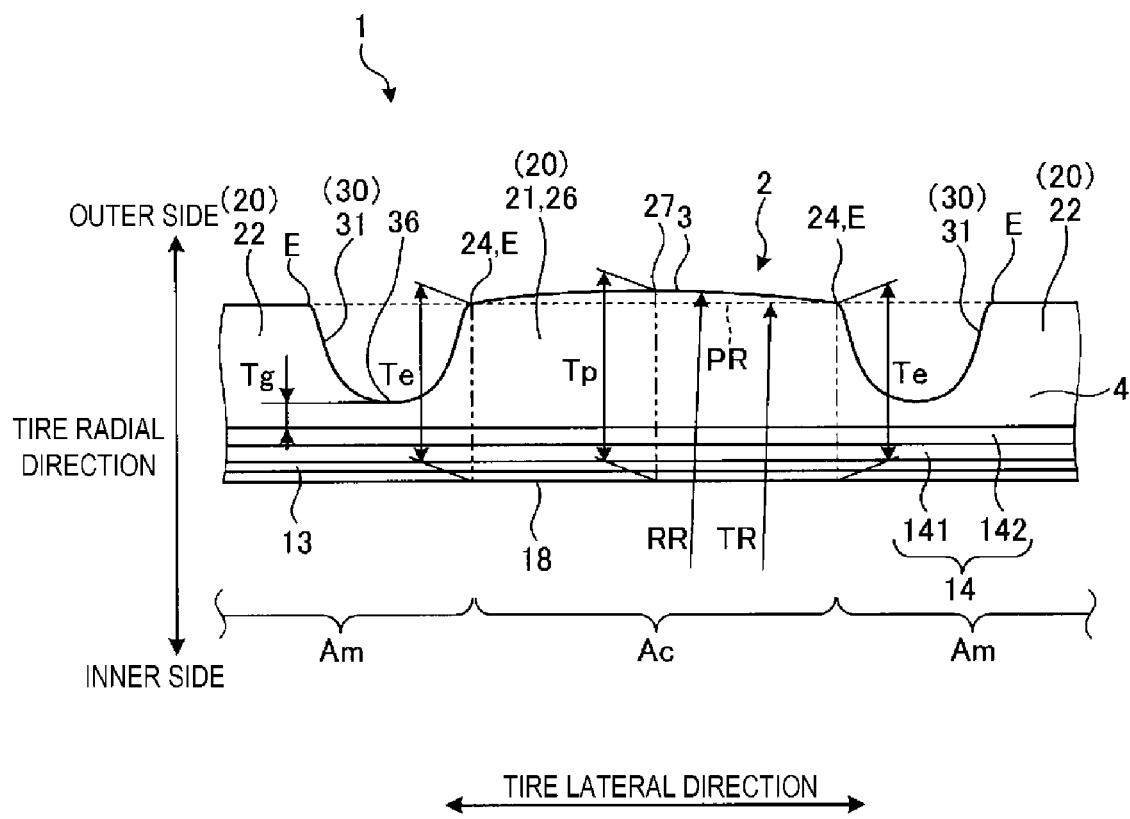
FIG. 6 is a detailed cross-sectional view illustrating a main portion of a pneumatic tire according to a second embodiment.

FIG. 6 is a detailed cross-sectional view of a main portion of the pneumatic tire 1 according to the second embodiment. In the pneumatic tire 1 according to the second embodiment, in the tread portion 2, the relationship among the tire average thickness Gc in the center region Ac, the tire average thickness Gsh in the shoulder regions Ash, and the tire average thickness Gm in the intermediate regions Am is within the range of 1.05≤(Gc/Gsh)≤1.35 and satisfies the relationship Gc≥Gm>Gsh, as is the case with the pneumatic tire 1 according to the first embodiment.

Additionally, in the pneumatic tire 1 according to the second embodiment, at least one of the land portions 20 located in the center region Ac and in the intermediate regions Am is formed as a protrusion-shaped land portion 26 in which a relationship between a thickness Te of the land portion 20 at the position of an end portion in the tire lateral direction and a thickness Tp of the land portion 20 at a central position in the tire lateral direction is Tp>Te. In other words, the protrusion-shaped land portion 26 is thicker at the central position in the tire lateral direction than at the positions of both end portions in the tire lateral direction. The thickness in this case is the distance between the ground contact surface 3 and the tire inner surface 18 in a tire meridian cross-sectional view.

In the second embodiment, the center land portion 21 corresponds to the protrusion-shaped land portion 26. The thickness Te of the center land portion 21 at the position of the end portion in the tire lateral direction corresponds to the distance between the tire inner surface 18 and an intersection point 24 between a groove wall 35 of the center main groove 31 defining the center land portion 21 and the ground contact surface 3 of the center main groove 31. The thickness Tp at the central position in the tire lateral direction is a distance between the tire inner surface 18 and a central position 27, in the tire lateral direction, of the ground contact surface 3 of the center land portion 21. In the center land portion 21 corresponding to the protrusion-shaped land portion 26, the relationship between the thickness Te at the position of the end portion in the tire lateral direction and the thickness Tp at the central position in the tire lateral direction is Tp>Te, the thicknesses Te and Tp being defined as described above.

Additionally, the center land portion 21 is formed in an arc shape in which the ground contact surface 3 representing an outer profile line of the center land portion 21 in a tire meridian cross-sectional view bulges outward in the tire radial direction. Accordingly, the center land portion 21 is formed as the protrusion-shaped land portion 26 that is thicker at the central position in the tire lateral direction than the positions of both end portions in the tire lateral direction.

Additionally, in the center land portion 21, the ground contact surface 3 is formed projecting outward, in the tire radial direction, from a tread profile PR corresponding to a contour line used as a reference for the ground contact surface 3 of the center land portion 21. Note that the tread profile PR is a standard contour line for an internal-pressure uninflated state, and a comparison between the ground contact surface 3 of the center land portion 21 and the tread profile PR refers to a comparison between the shape of the ground contact surface 3 of the center land portion 21 in the internal-pressure uninflated state and the tread profile PR.

In this case, the tread profile PR refers to an arc that passes through at least three of the four opening ends E of the two main grooves 30 adjacent to the land portion 20 and opposite to each other in the tire lateral direction in a tire meridian cross-sectional view of the internal-pressure uninflated state, the center of the arc being located inward of the ground contact surface 3 in the tire radial direction, the arc being drawn with the maximum radius of curvature. In other words, the tread profile PR of the center land portion 21 is an arc that passes through at least three of the four open ends E of the two center main grooves 31 adjacent to opposite sides of the center land portion 21 in the tire lateral direction, and the center of the arc is an arc that is positioned inward in the tire radial direction of the ground contact surface 3 and is drawn with a maximum radius of curvature.

Additionally, for the ground contact surface 3 of the center land portion 21, a radius of curvature RR of an arc corresponding to the shape of the ground contact surface 3 in a tire meridian cross-section view is smaller than a radius of curvature TR of the arc forming the tread profile PR. Specifically, the radius of curvature RR of the ground contact surface 3 of the center land portion 21 in a tire meridian cross-sectional view is within a range of 0.1≤(RR/TR)≤0.4 with respect to the radius of curvature TR of the tread profile PR.

Furthermore, in the tread portion 2, a relationship between a minimum thickness Tg of the rubber thickness between the belt layer 14 and a groove bottom 36 of the center main groove 31 defining the center land portion 21 and the average thickness Tc of the tread rubber layer 4 located outward, in the tire radial direction, from the belt layer 14 in the center region Ac is within a range of $0.12 \leq (Tg/Tc) \leq 0.4$. Note that the relationship between the minimum thickness Tg of the rubber thickness between the groove bottom 36 of the center main groove 31 and the belt layer 14 and the average thickness Tc of the tread rubber layer 4 in the center region Ac is preferably within a range of $0.15 \leq (Tg/Tc) \leq 0.25$.

In the pneumatic tire 1 according to the second embodiment, the center land portion 21 is formed as the protrusion-shaped land portion 26 that is thicker at the central position in the tire lateral direction than at the positions of both end portions in the tire lateral direction. Thus, the strength against an external obstacle can be more reliably increased. Thus, even in a case where the projection 105 on the road surface 100 is treaded by the center land portion 21, penetration of the center land portion 21 by the projection 105 can be more reliably suppressed. As a result, the shock burst resistance performance can be more reliably improved.

Additionally, the center land portion 21 corresponding to the protrusion-shaped land portion 26 is formed in an arc shape in which the ground contact surface 3 bulges outward in the tire radial direction, and the relationship between the radius of curvature RR of the ground contact surface 3 and the radius of curvature TR of the tread profile PR is within the range of $0.1 \leq (RR/TR) \leq 0.4$. Thus, with the rolling resistance reduced, a possible shock burst can be suppressed. In other words, in a case where the radius of curvature RR of the ground contact surface 3 of the center land portion 21 with respect to the radius of curvature TR of the tread profile PR is represented as $(RR/TR)<0.1$, the radius of curvature RR of the ground contact surface 3 is excessively small. Thus, the ground contact surface 3 of the center land portion 21 may excessively significantly bulge outward in the tire radial direction with respect to the tread profile PR. In this case, the central region, in the tire lateral direction, of the contact patch shape of the entire ground contact surface 3 of the tread portion 2 has a significantly larger contact length than both end regions of the contact patch shape in the tire lateral direction, making only the central region in the tire lateral direction likely to deflect significantly in a case where the tread portion 2 comes into contact with the ground. This may be likely to increase the rolling resistance. Additionally, in a case where the radius of curvature RR of the ground contact surface 3 of the center land portion 21 with respect to the radius of curvature TR of the tread profile PR is represented as $(RR/TR)>0.4$, the radius of curvature RR of the ground contact surface 3 is excessively large. Thus, the ground contact surface 3 of the center land portion 21 may excessively insignificantly bulge outward in the tire radial direction. In this case, properly ensuring the tire thickness of the center region Ac is difficult, and increasing the strength at break of the center region Ac may be difficult. This may lead to difficulty in appropriately improving the shock burst resistance performance.

In contrast, in a case where the relationship between the radius of curvature RR of the ground contact surface 3 of the center land portion 21 and the radius of curvature TR of the tread profile PR is within the range of $0.1 \leq (RR/TR) \leq 0.4$, then with the significant deflection of only the central region of tread portion 2 in the tire lateral direction suppressed, the strength at break of the center region Ac can be ensured in a case where the tread portion 2 comes into contact with the ground. As a result, both shock burst resistance performance and reduced rolling resistance can be more reliably provided in a compatible manner.

Additionally, in the tread portion 2, the relationship between the minimum thickness Tg of the rubber thickness between the groove bottom 36 of the center main groove 31 and the belt layer 14 and the average thickness Tc of the tread rubber layer 4 of the center region Ac is within the range of $0.12 \leq (Tg/Tc) \leq 0.4$. Thus, with energy loss during rotation of the pneumatic tire 1 reduced, significant local deformation of the tread portion 2 can be suppressed. In other words, in a case where the minimum thickness Tg of the rubber thickness between the groove bottom 36 of the center main groove 31 and the belt layer 14 with respect to the average thickness Tc of the tread rubber layer 4 of the center region Ac is represented as $(Tg/Tc)<0.12$, the minimum thickness Tg between the center main groove 31 and the belt layer 14 is excessively small. Thus, in a case where the tread portion 2 treads the projection 105 and is subjected to bending displacement, excessively significant deformation may occur at the position of the center main groove 31. In this case, the tread portion 2 deforms locally, and thus the tread portion 2 may be likely to be damaged, and improving the shock burst resistance performance may be difficult. Additionally, in a case where the minimum thickness Tg of the rubber thickness between the groove bottom 36 of the center main groove 31 and the belt layer 14 with respect to the average thickness Tc of the tread rubber layer 4 of the center region Ac is represented as $(Tg/Tc)>0.4$, the minimum thickness Tg of the rubber thickness between the center main groove 31 and the belt layer 14 is excessively large. Thus, the energy loss during rotation of the pneumatic tire 1 is likely to increase, and reducing the rolling resistance may be difficult.

In contrast, in a case where the relationship between the minimum thickness Tg of the rubber thickness between the groove bottom 36 of the center main groove 31 and the belt layer 14 and the average thickness Tc of the tread rubber layer 4 of the center region Ac is within a range of $0.12 \leq (Tg/Tc) \leq 0.4$, then with the energy loss during rotation of the pneumatic tire 1 reduced, significant local deformation of the tread portion 2 at the position of the center main groove 31 can be suppressed in a case where the projection 105 is treaded by the tread portion 2. As a result, both shock burst resistance performance and reduced rolling resistance can be more reliably provided in a compatible manner.

Third Embodiment

The pneumatic tire 1 according to a third embodiment has a configuration substantially similar to the configuration of the pneumatic tire 1 according to the second embodiment. However, the pneumatic tire 1 according to the third embodiment has the feature that a portion of the belt layer 14 bulges inward in the tire radial direction. The other components are similar to the corresponding components of the second embodiment, and thus description of the components is omitted and the same reference numerals are used.

Figure 7:
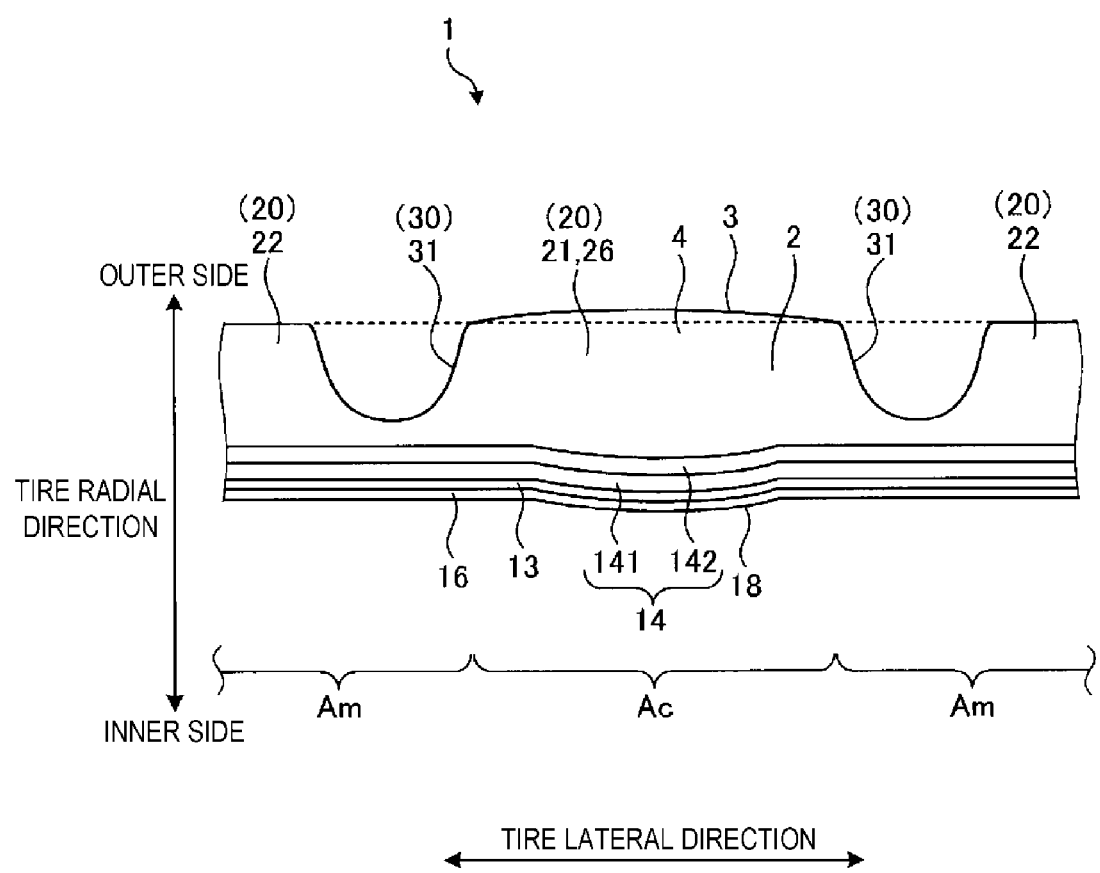
FIG. 7 is a detailed cross-sectional view illustrating a main portion of a pneumatic tire according to a third embodiment.

FIG. 7 is a detailed cross-sectional view of a main portion of the pneumatic tire 1 according to the third embodiment. In the pneumatic tire 1 according to the third embodiment, in the tread portion 2, the relationship among the tire average thickness Gc in the center region Ac, the tire average thickness Gsh in the shoulder regions Ash, and the tire average thickness Gm in the intermediate regions Am is within the range of $1.05 \leq (Gc/Gsh) \leq 1.35$ and satisfies the relationship $Gc \geq Gm > Gsh$, as is the case with the pneumatic tire 1 according to the second embodiment. Additionally, the center land portion 21 is formed as the protrusion-shaped land portion 26 that extends outward in the tire radial direction.

Furthermore, in the pneumatic tire 1 according to the third embodiment, the belt layer 14 bulges inward in the tire radial direction in the internal-pressure uninflated state at a position located inward, in the tire radial direction, of at least one of the land portions 20 located in the center region Ac and in the intermediate regions Am. In the third embodiment, the belt layer 14 bulges inward in the tire radial direction in the internal-pressure uninflated state at the position located inward of the center land portion 21 in the tire radial direction. In other words, the belt layer 14 is formed projecting toward the tire inner surface 18 in the internal-pressure uninflated state at the position located inward of the center land portion 21 in the tire radial direction.

Note that, with the belt layer 14 bulging inward in the tire radial direction, the carcass layer 13 and the innerliner 16 disposed inward of the belt layer 14 in the tire radial direction and along the belt layer 14 also bulge inward in the tire radial direction at a position located inward of the center land portion 21 in the tire radial direction.

In the pneumatic tire 1 according to the third embodiment, the belt layer 14 bulges inward in the tire radial direction internal-pressure uninflated state at the position located inward of the center land portion 21 in the tire radial direction. Thus, the tread rubber layer 4 located in the center region Ac can be more reliably provided with a large rubber thickness. Accordingly, the strength at break of the center region Ac can be more reliably increased. As a result, the shock burst resistance performance can be more reliably improved.

Fourth Embodiment

The pneumatic tire 1 according to a fourth embodiment has a configuration substantially similar to the configuration of the pneumatic tire 1 according to the first embodiment. However, the pneumatic tire 1 according to the fourth embodiment has the feature that a belt reinforcing layer 15 is disposed outward of the belt layer 14 in the tire radial direction. The other components are similar to the corresponding components of the first embodiment, and thus description of the components is omitted and the same reference numerals are used.

Figure 8:
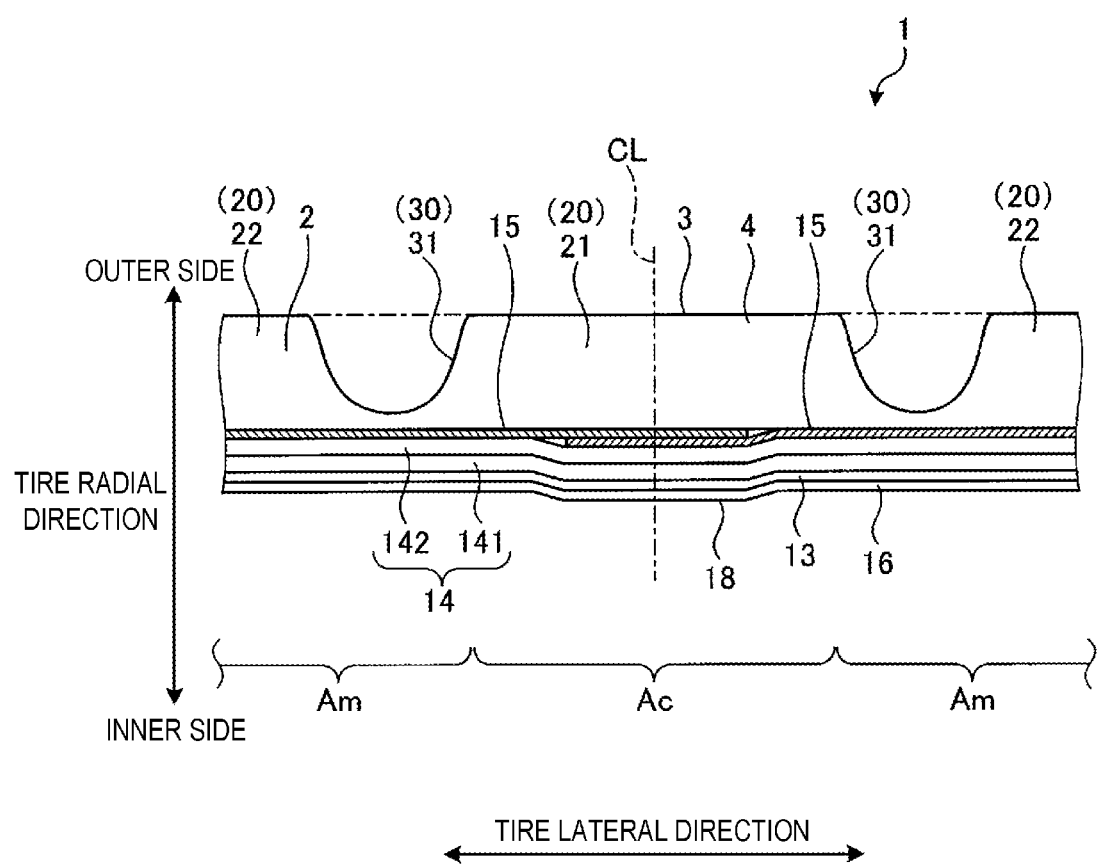
FIG. 8 is a detailed cross-sectional view illustrating a main portion of a pneumatic tire according to a fourth embodiment.

FIG. 8 is a detailed cross-sectional view of a main portion of the pneumatic tire according to a fourth embodiment. In the pneumatic tire 1 according to the fourth embodiment, in the tread portion 2, the relationship among the tire average thickness Gc in the center region Ac, the tire average thickness Gsh in the shoulder regions Ash, and the tire average thickness Gm in the intermediate regions Am is within the range of $1.05 \leq (Gc/Gsh) \leq 1.35$ and satisfies the relationship $Gc \geq Gm > Gsh$, as is the case with the pneumatic tire 1 according to the first embodiment.

Furthermore, in the pneumatic tire 1 according to the fourth embodiment, the belt reinforcing layer 15 is disposed outward of the belt layer 14 in the tire radial direction. The belt reinforcing layer 15 is disposed outward of the belt layer 14 in the tire radial direction to cover the belt layer 14 in the tire circumferential direction. The belt reinforcing layer 15 is formed of coating rubber-covered cords (not illustrated) disposed side by side in the tire lateral direction and substantially parallel to the tire circumferential direction. The cords of the belt reinforcing layer 15 are made of steel or organic fibers such as polyester, rayon, or nylon, and the angle of the cords is within a range of ±5° with respect to the tire circumferential direction. In the fourth embodiment, the belt reinforcing layer 15 is disposed all over the region in the tire lateral direction in which the belt layer 14 is disposed, and covers the end portions of the belt layer 14 in the tire lateral direction.

Additionally, the belt reinforcing layer 15, disposed outward of the belt layer 14 in the tire radial direction, is provided by winding, in the tire circumferential direction, a band-like strip material having, for example, a width of approximately 10 mm. In other words, the belt reinforcing layer 15 is disposed by spirally winding the band-like strip material outward of the belt layer 14 in the tire radial direction. At this time, the band-like strip material is wound in one layer at a position located inward, in the tire radial direction, of the second land portions 22 and the shoulder land portions 23, and in two layers overlapping in the tire radial direction, at a position located inward of the center land portion 21 in the tire radial direction. In other words, the band-like strip material is spirally wound without overlapping in the tire radial direction at the position located inward of the second land portions 22 and the shoulder land portions 23, while being wound in such a manner as to overlap the strip material itself in the tire radial direction at the position located inward of the center land portion 21 in the tire radial direction. Thus, in the belt reinforcing layer 15, a larger number of strip materials are layered at the position of the center region Ac than at the positions other than the position of the center region Ac.

In the pneumatic tire 1 according to the fourth embodiment, the belt reinforcing layer 15 is disposed outward of the belt layer 14 in the tire radial direction as described above, and thus inappropriate deflection of the tread portion 2 is suppressed in a case where the ground contact surface 3 comes into contact with the ground. This enables a reduction in difference in contact length between the central region in the tire lateral direction and the end portion region in the tire lateral direction which difference occurs in a case where the ground contact surface 3 contacts the ground, allowing suppression of an increase in rolling resistance caused by a significant difference in contact length depending on the position in the tire lateral direction.

Additionally, since a larger number of the belt reinforcing layers 15 are layered at the position of the center region Ac than at the positions other than the position of the center region Ac, the strength at break of the center region Ac can be more reliably increased. Damage caused to the belt layer 14 by the projection 105 can be more reliably suppressed in a case where the projection 105 is treaded by the tread portion 2. As a result, both shock burst resistance performance and reduced rolling resistance can be more reliably provided in a compatible manner.

Fifth Embodiment

The pneumatic tire 1 according to a fifth embodiment has a configuration substantially similar to the configuration of the pneumatic tire 1 according to the first embodiment. However, the pneumatic tire 1 according to the fifth embodiment has the feature that a circumferential narrow groove 45 is formed in the shoulder regions Ash. The other components are similar to the corresponding components of the first embodiment, and thus description of the components is omitted and the same reference numerals are used.

Figure 9:
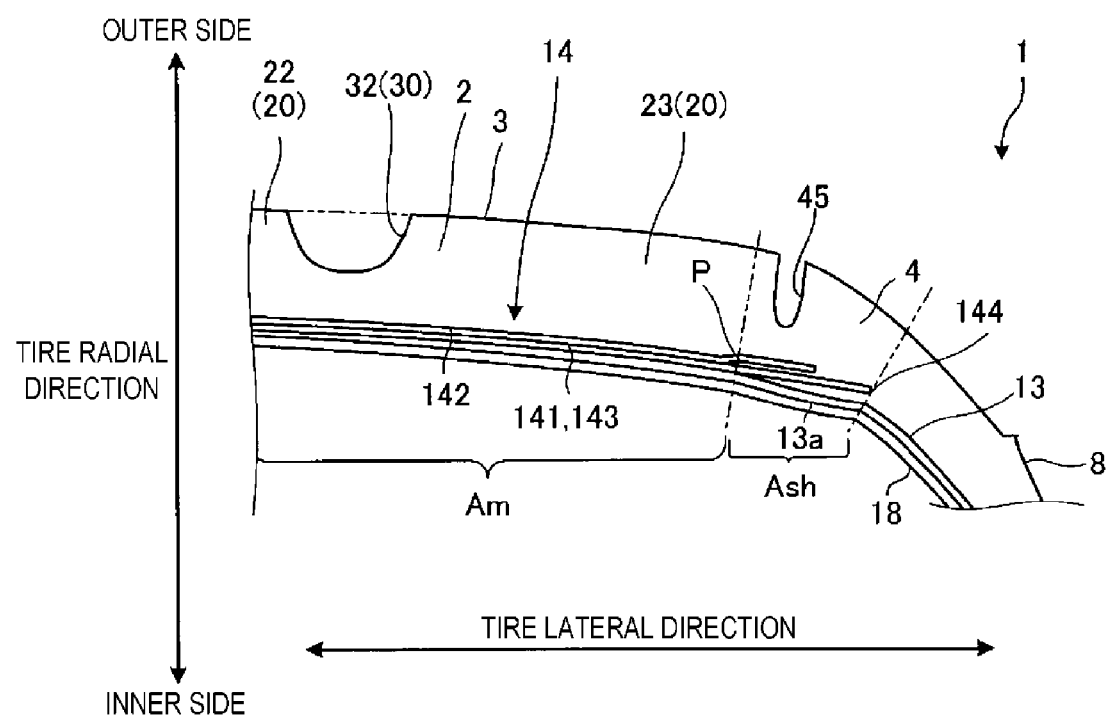
FIG. 9 is a detailed cross-sectional view illustrating a main portion of a pneumatic tire according to a fifth embodiment.

FIG. 9 is a detailed cross-sectional view of a main portion of the pneumatic tire 1 according to the fifth embodiment. In the pneumatic tire 1 according to the fifth embodiment, in the tread portion 2, the relationship among the tire average thickness Gc in the center region Ac, the tire average thickness Gsh in the shoulder regions Ash, and the tire average thickness Gm in the intermediate regions Am is within the range of 1.05≤(Gc/Gsh)≤1.35 and satisfies Gc≥Gm>Gsh, as is the case with the pneumatic tire 1 according to the first embodiment.

Additionally, in the pneumatic tire 1 according to the fifth embodiment, the circumferential narrow groove 45 extending in the tire circumferential direction is formed in at least one of the shoulder land portions 23 located on the opposite sides in the tire lateral direction. Specifically, the circumferential narrow groove 45 is disposed in the shoulder region Ash in the shoulder land portion 23. In other words, the circumferential narrow groove 45 is formed in at least one of the shoulder regions Ash located on the opposite sides in the tire lateral direction. The circumferential narrow groove 45 formed in the shoulder region Ash includes an opening portion extending to the ground contact surface 3 and having a groove width of 0.6 mm or more and 2 mm or less and a groove depth of 3 mm or more and 5 mm or less.

Furthermore, in the pneumatic tire 1 according to the fifth embodiment, portions of the carcass layer 13 located in the shoulder regions Ash bulge toward the tire inner surface 18 in the internal-pressure uninflated state. In other words, in the carcass layer 13 in the internal-pressure uninflated state, the most of a portion of the carcass layer 13 located in the tread portion 2 bulges outward in the tire radial direction, and the most of a portion of the carcass layer 13 located in the sidewall portion 8 bulges outward in the tire lateral direction. Specifically, in the carcass layer 13, most portions of the carcass layer 13 other than the bead portion 10 bulge toward the tire outer side surface in the internal-pressure uninflated state for the pneumatic tire 1, whereas portions of the carcass layer 13 located in the shoulder regions Ash are formed to bulge toward the tire inner surface 18. The carcass layer 13 includes inward bulging portions 13a in portions of the layer 13 located at the shoulder regions Ash, the inward bulging portions 13a bulging toward the tire inner surface 18 as described above in the internal-pressure uninflated state.

In a case where the pneumatic tire 1 according to the fifth embodiment is used, as is the case with the pneumatic tire 1 according to the first embodiment, the pneumatic tire 1 is mounted on the rim wheel R by fitting the rim wheel R to the bead portion 10, and is then inflated by filling the inside with air. In a case where the inside is filled with air, tension is applied to the whole pneumatic tire 1 due to the internal pressure, and the tension is mainly received by the carcass layer 13. In other words, the carcass layer 13 extends between the pair of bead portions 10 and has a role as the backbone of the pneumatic tire 1. Thus, tension caused by the internal pressure is mainly received by the carcass layer 13. Thus, in an internal-pressure inflated state, a high tensile force acts on the carcass layer 13.

In contrast, the carcass layer 13 included in the pneumatic tire 1 according to the fifth embodiment include the inward bulging portions 13a in the portions of the layer 13 located at the shoulder regions Ash. After the pneumatic tire 1 is inflated to an internal pressure to cause tension to act on the carcass layer 13, the inward bulging portion 13a of the carcass layer 13 is shaped to bulge toward the tire outer side surface due to the internal pressure. Subsequently, tension acts on the inward bulging portion 13a. Thus, even after the internal-pressure inflation, the inward bulging portion 13a of the carcass layer 13 can keep the tension acting due to the internal pressure low, enabling a reduction in bending rigidity at or near the shoulder regions Ash. Accordingly, in a case where the projection 105 is treaded by the vicinity of the center region Ac of the tread portion 2, the shoulder regions Ash can be more reliably preferentially deformed, enabling a reduction in pressure applied to the tread portion 2 by the projection 105. As a result, the shock burst resistance performance can be more reliably improved.

Additionally, in the pneumatic tire 1 according to the fifth embodiment, since the circumferential narrow groove 45 is formed in the shoulder region Ash, the rigidity of the shoulder region Ash in the shoulder land portion 23 can be reduced. Thus, in a case where a load acts on the shoulder region Ash, possible strain can be relieved. This enables a more reliable reduction in energy loss in the shoulder regions Ash where, while the vehicle is traveling, the energy loss during rotation of the pneumatic tire 1 is likely to increase. Accordingly, the resistance offered in a case where the shoulder regions Ash deflect can be more reliably reduced, and thus the energy loss during rotation of the pneumatic tire 1 can be reduced, enabling a reduction in rolling resistance.

Additionally, the circumferential narrow groove 45 formed in the shoulder region Ash allow the shoulder region Ash to deform preferentially in a case where the projection 105 is treaded by the vicinity of the center region Ac of the tread portion 2, allowing the whole tread portion 2 to deflect. This enables a reduction in pressure applied to the tread portion 2 by the projection 105. Accordingly, a possible shock burst can be suppressed. As a result, both shock burst resistance performance and reduced rolling resistance can be more reliably provided in a compatible manner.

Sixth Embodiment

The pneumatic tire 1 according to a sixth embodiment has a configuration substantially similar to the configuration of the pneumatic tire 1 according to the first embodiment. However, the pneumatic tire 1 according to the sixth embodiment includes side reinforcing rubber 50 in the sidewall portions 8. The other components are similar to the corresponding components of the first embodiment, and thus description of the components is omitted and the same reference numerals are used.

Figure 10:
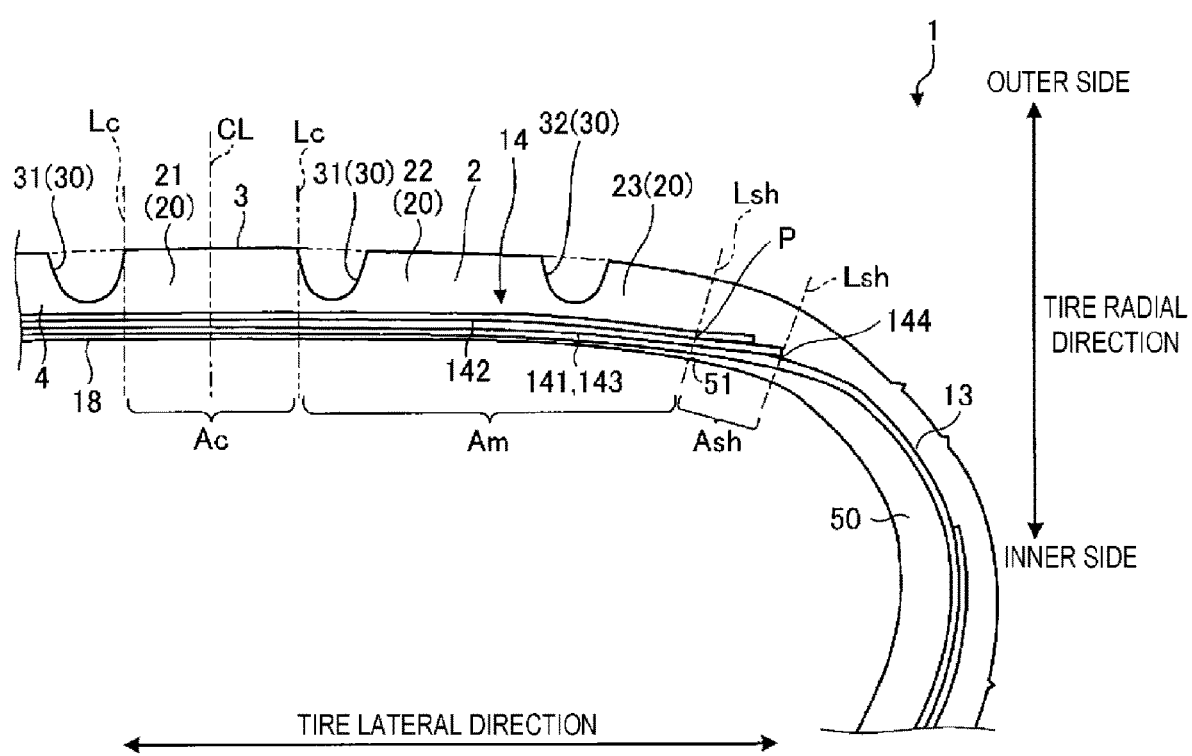
FIG. 10 is a detailed cross-sectional view illustrating a main portion of a pneumatic tire according to a sixth embodiment.

FIG. 10 is a detailed cross-sectional view illustrating a main portion of the pneumatic tire 1 according to the sixth embodiment. In the pneumatic tire 1 according to the sixth embodiment, in the tread portion 2, the relationship among the tire average thickness Gc in the center region Ac, the tire average thickness Gsh in the shoulder regions Ash, and the tire average thickness Gm in the intermediate regions Am is within the range of 1.05≤(Gc/Gsh)≤1.35 and satisfies the relationship Gc≥Gm>Gsh, as is the case with the pneumatic tire 1 according to the first embodiment.

Additionally, the pneumatic tire 1 according to the sixth embodiment includes the side reinforcing rubber 50 in the sidewall portions 8, and is used as what is called a run-flat tire that can travel even in a case where air escapes due to a puncture or the like. The side reinforcing rubber 50 disposed in the sidewall portions 8 is a rubber member provided inside the sidewall portions 8, and is disposed without being exposed from the tire inner surface or the tire outer surface. Specifically, the side reinforcing rubber 50 is located mainly inward, in the tire lateral direction, of portions of the carcass layer 13 located at the sidewall portions 8. In each sidewall portion 8, the side reinforcing rubber 50 is disposed between the carcass layer 13 and the innerliner 16, and is shaped like a crescent such that the shape of the side reinforcing rubber 50 in a meridian cross-section of the pneumatic tire 1 projects outward in the tire lateral direction.

The side reinforcing rubber 50 shaped like a crescent includes an outer end portion 51 corresponding to an outer end portion in the tire radial direction and located inward, in the tire radial direction, of the belt layer 14 in the tread portion 2, and the side reinforcing rubber 50 and the belt layer 14 are disposed partially overlapping with each other in the tire radial direction by a predetermined range of amount of overlap. Thus, at least a portion of the side reinforcing rubber 50 near the outer end portion 51 is located in the shoulder region Ash. The side reinforcing rubber 50 thus disposed is formed of a rubber material having a higher strength than the rubber forming the sidewall portions 8 and the rim cushion rubber 17 disposed in the bead portions 10.

The side reinforcing rubber 50 may be partially located in the intermediate region Am rather than being located only in the shoulder region Ash. Additionally, in a case where a portion of the side reinforcing rubber 50 is located in the shoulder region Ash or the intermediate region Am, the tire average thickness Gsh in the shoulder regions Ash and the tire average thickness Gm in the intermediate regions Am include the thickness of the side reinforcing rubber 50.

In the pneumatic tire 1 according to the sixth embodiment, the side reinforcing rubber 50 is disposed inward of the sidewall portion 8 as described above, thus increasing the bending rigidity of the sidewall portion 8. Thus, even in a case where air escapes due to a puncture or the like to cause a heavy load to act on the sidewall portion 8, deformation of the sidewall portion 8 can be reduced, and traveling can be performed as long as the speed has a predetermined value or smaller.

On the other hand, in the run-flat tire, the side reinforcing rubber 50 is disposed in the sidewall portion 8 to increase the bending rigidity of the sidewall portion 8. Thus, in a case where the projection 105 is treaded in the internal-pressure inflated state, the sidewall portion 8 is less likely to deflect. Thus, stress generated in a case where the projection 105 is treaded is likely to concentrate at the tread portion 2, making a shock burst more likely to occur.

In contrast, the pneumatic tire 1 according to the sixth embodiment has an increased tire average thickness Gc in the center region Ac and a reduced tire average thickness Gsh in the shoulder regions Ash. Thus, in a case where the projection 105 is treaded by the tread portion 2, the shoulder regions Ash are more likely to deform. Accordingly, the pressure applied to the tread portion 2 by the projection 105 can be reduced in a case where the projection 105 is treaded, allowing suppression of penetration of the tread portion 2 by the projection 105, which leads to a shock burst. As a result, both run-flat performance and shock burst resistance performance can be provided in a compatible manner.

Modified Examples

Note that, in the above-described first embodiment, four main grooves 30 are formed but that the number of the main grooves 30 may be different from four. Additionally, in the above-described first embodiment, the center region Ac coincides with the range, in the tire lateral direction, of the center 1 and portion 21 corresponding to the land portion 20 located on the tire equatorial plane CL. However, the center region Ac need not be located on the tire equatorial plane CL. For example, in a case where the main groove 30 is located on the tire equatorial plane CL, the center region Ac may correspond to a range, in the tire lateral direction, of the land portion 20 which range is defined by the main groove 30 located on the tire equatorial plane CL and the main groove 30 second closest to the tire equatorial plane CL. In other words, it is sufficient that a portion of the region interposed between two adjacent main grooves 30 which portion is closest to the tire equatorial plane CL is used as the center region Ac.

Additionally, in a case where the position of center of the center region Ac in the tire lateral direction differs from the position of the tire equatorial plane CL in the tire lateral direction, the intermediate regions Am located on the opposite sides of the tire equatorial plane CL in the tire lateral direction may have different widths in the tire lateral direction. In this case, the tire average thickness Gm in the intermediate regions Am has an average value for the intermediate regions Am located on the opposite sides of the tire equatorial plane CL in the tire lateral direction.

Additionally, in the first embodiment described above, the lug grooves 40 are not formed across the adjacent main grooves 30, but the lug grooves 40 may be formed across the adjacent main grooves 30. In other words, the land portion 20 in each region may be formed in a rib shape extending in the tire lateral direction, or in a block shape defined by the main grooves 30 adjacent to the land portion 20 in the tire lateral direction and the lug grooves 40 adjacent to the land portion 20 in the tire circumferential direction.

Additionally, in the above-described first embodiment, the rubber of the tread rubber layer 4 located in the center region Ac is 10 MPa or more and 16 MPa or less in modulus of 300% elongation. However, for the rubber forming the tread rubber layer 4, the rubber located in the regions other than the center region Ac may also be 10 MPa or more and 16 MPa or less in modulus of 300% elongation.

Additionally, in the second embodiment described above, the center land portion 21 corresponds to the protrusion-shaped land portion 26. However, any of the land portions 20 other than the center land portion 21 may be formed as the protrusion-shaped land portion 26. For example, the second land portions 22 located in the intermediate regions Am may be formed as the protrusion-shaped land portions 26, or both the center land portion 21 located in the center region Ac and each of the second land portions 22 positioned in the intermediate regions Am may be formed as the protrusion-shaped land portions 26. In the tread portion 2, at least one of the land portions 20 located in the center region Ac and the intermediate regions Am may be formed as the protrusion-shaped land portion 26.

Additionally, in the third embodiment described above, the belt layer 14 bulges inward in the tire radial direction at the position located inward of the center land portion 21 in the tire radial direction. However, the belt layer 14 may bulge inward in the tire radial direction at a position located inward, in the tire radial direction, of any portion other than the center land portion 21. For example, the belt layer 14 may bulge inward in the tire radial direction at a position located inward, in the tire radial direction, of the second land portion 22 located in each intermediate region Am, or may bulge inward in the tire radial direction at positions located inward, in the tire radial direction, of both the center land portion 21 positioned in the center region Ac and the second land portion 22 positioned in each intermediate region Am. It is sufficient that the belt layer 14 bulges inward in the tire radial direction at the position located inward, in the tire radial direction, of at least one land portion 20 of the land portions 20 located in the center region Ac and the intermediate regions Am.

Additionally, in the fifth embodiment described above, the circumferential narrow groove 45 formed in the shoulder region Ash may be formed in the shoulder regions Ash on the opposite sides in the tire lateral direction or may be formed in one of the shoulder regions Ash. Additionally, the circumferential narrow groove 45 need not necessarily be formed continuously all around the circumference, and the circumferential narrow groove 45 may be discontinuous in the tire circumferential direction to the extent that the function of the circumferential narrow groove 45 to reduce the rigidity of the shoulder regions Ash is not degraded.

Additionally, in the fifth embodiment described above, the carcass layer 13 includes the inward bulging portion 13*a* in the portion located in each shoulder region Ash. However, the inward bulging portion 13*a* need not clearly bulge toward the tire inner surface 18 in the internal-pressure uninflated state. For example, the inward bulging portion 13*a* may be formed in a linear shape or in a wavy shape in a tire meridian cross-sectional view in the internal-pressure uninflated state. The inward bulging portion 13*a* of the carcass layer 13 is shaped to bulge toward the tire outer side surface due to the tension acting on the carcass layer 13 in the internal-pressure inflated state. However, at this time, the inward bulging portion 13*a* may have any shape as long as the shape enables a reduction in tension in the portion of the carcass layer 13 located in the shoulder region Ash.

Additionally, the above-described first to sixth embodiments and modified examples may be appropriately combined. For example, any of the configurations illustrated in the second to fifth embodiments may be combined with the side reinforcing rubber 50 illustrated in the sixth embodiment. In the pneumatic tire 1, in a case where, in at least the tread portion 2, the relationship among the tire average thickness Gc in the center region Ac, the tire average thickness Gsh in the shoulder regions Ash, and the tire average thickness Gm in the intermediate regions Am is within the range of $1.05 \leq (Gc/Gsh) \leq 1.35$ and satisfies the relationship $Gc \geq Gm > Gsh$, both shock burst resistance performance and reduced rolling resistance can be provided in a compatible manner.

EXAMPLES

FIGS. 11A to 11C are tables showing the results of performance tests of pneumatic tires. In relation to the pneumatic tire 1 described above, performance evaluation tests will be described below that were conducted on a pneumatic tire according to a conventional example, the pneumatic tires 1 according to present technology, and a pneumatic tire according to a comparative example for comparison with the pneumatic tire 1 according to the present technology. The performance evaluation tests were performed on the shock burst resistance, indicating durability against shock bursts, and rolling resistance performance indicating performance related to the rolling resistance.

The performance evaluation tests were performed using the pneumatic tire 1 having a nominal size of 245/50R19 105W, specified by JATMA, and the pneumatic tire 1 was mounted on a JATMA standard rim wheel with a rim size of 19×7.5J. In the evaluation method for each of the test items, for the shock burst resistance performance, the test tires were inflated to an air pressure of 220 kPa, and plunger destructive tests were conducted at a plunger diameter of 19 mm and at an insertional speed of 50 mm/min accordance with JIS K6302 to measure tire fracture energy. The shock burst resistance is expressed as index values with the conventional example described below being assigned the value of 100. Larger index values indicate higher tire strength and more excellent shock burst resistance.

Additionally, for the rolling resistance performance, the test tires are inflated to 250 kPa, and the rolling resistance was measured after 30 min pre-running at a drum radius of 854 mm, at a speed of 80 km/h, and at a load of 7.26 kN. The rolling resistance performance is expressed as index values each corresponding to the reciprocal of the measured rolling resistance, with the conventional example described below being assigned the value of 100. Larger index values indicate lower rolling resistance.

The performance evaluation tests were conducted on 21 types of pneumatic tires including the pneumatic tire according to Conventional Example corresponding to an example of conventional pneumatic tire, Examples 1 to 17 corresponding to the pneumatic tires 1 according to the present technology, and Comparative Examples 1 to 3 corresponding to pneumatic tires compared with the pneumatic tire 1 according to the present technology. In the pneumatic tire according to Conventional Example, the tire average thickness Gc in the center region Ac of the tread portion 2 is smaller than the tire average thickness Gsh in the shoulder regions Ash. Additionally, in the pneumatic tires according to Comparative Examples 1 to 3, the relationship among the tire average thickness Gc in the center region Ac, the tire average thickness Gsh in the shoulder regions Ash, and the tire average thickness Gm in the intermediate regions Am is not within the range of $1.05 \leq (Gc/Gsh) \leq 1.35$ or does not satisfy $Gc \geq Gm > Gsh$.

In contrast, in all of Examples 1 to 17 corresponding to examples of the pneumatic tire 1 according to the present technology, the tire average thickness Gc in the center region Ac with respect to the tire average thickness Gsh in the shoulder regions Ash is within the range of $1.05 \leq (Gc/Gsh) \leq 1.35$, and the tire average thickness Gc in the center region Ac, the tire average thickness Gsh in the shoulder regions Ash, and the tire average thickness Gm in the intermediate regions Am satisfy the relationship $Gc \geq Gm > Gsh$. Furthermore, the pneumatic tires 1 according to Examples 1 to 17 differ in the average thickness Tc of the tread rubber layer 4 in the center region Ac with respect to the average thickness Tsh of the tread rubber layer 4 in the shoulder regions Ash (Tc/Tsh), the average thickness Tm of the tread rubber layer 4 in the intermediate regions Am with respect to the average thickness Tsh of the tread rubber layer 4 in the shoulder regions Ash (Tm/Tsh), the average actual rubber thickness Vc of the tread rubber layer 4 in the center region Ac with respect to the average actual rubber thickness Vsh of the tread rubber layer 4 in the shoulder regions Ash (Vc/Vsh), the presence of the protrusion-shaped land portion 26, the radius of curvature RR of the ground contact surface 3 of the protrusion-shaped land portion 26 with respect to the radius of curvature TR of the tread profile PR (RR/TR), the presence of a portion of the belt layer 14 bulging inward in the tire radial direction, the minimum thickness Tg of the rubber thickness between the groove bottom 36 of the center main groove 31 and the belt layer 14 with respect to the average thickness Tc of the tread rubber layer 4 in the center region Ac (Tg/Tc), the modulus MPa of 300% elongation of the tread rubber layer 4 in the center region Ac, the presence of the circumferential narrow groove 45 in the shoulder regions Ash, the presence of the inward bulging portion 13*a* of the carcass layer 13, the presence of the belt reinforcing layer 15, whether a large number of pieces of the belt reinforcing layer 15 are layered in the center region Ac, and the presence of the side reinforcing rubber 50.

The results of the performance evaluation tests using these pneumatic tires 1 indicate that the pneumatic tires 1 according to Examples 1 to 17 can improve both the shock burst resistance and the rolling resistance compared to Conventional Example without degrading either of the performances compared to Conventional Example, as illustrated in FIGS. 11A to 11C. In other words, the pneumatic tires 1 according to Examples 1 to 17 can provide both shock burst resistance performance and reduced rolling resistance in a compatible manner.

The invention claimed is:

1. A pneumatic tire comprising:
at least one carcass layer;
a belt layer disposed outward, in a tire radial direction, of a portion of the carcass layer located in a tread portion; and
a tread rubber layer disposed outward, in the tire radial direction, of the belt layer in the tread portion,
the tread portion being provided with a main groove extending in a tire circumferential direction, and a plurality of land portions defined by the main groove, and
in the tread portion,
assuming that a center region is a region where a center land portion included in the land portions and corresponding to the land portion closest to a tire equatorial plane is located,
shoulder regions are each a region between a position corresponding to 85% of a width of the belt layer in a tire lateral direction and an end portion of the belt layer in the tire lateral direction, and
intermediate regions are each a region between the center region and a corresponding one of the shoulder regions,
a relationship between a tire average thickness Gc in the center region and a tire average thickness Gsh in the shoulder regions and a tire average thickness Gm in the intermediate regions being within a range of $1.05 \leq (Gc/Gsh) \leq 1.35$ and satisfying a relationship $Gc \geq Gm > Gsh$, and
in the tread portion, a relationship between an average actual rubber thickness Vc of the tread rubber layer in the center region and an average actual rubber thickness Vsh of the tread rubber layer in the shoulder regions is within a range of $1.7 \leq (Vc/Vsh) \leq 2.5$; wherein
at least one of the land portions located in the center region or the intermediate regions is formed as a projection-shaped land portion, and
the projection-shaped land portion of the at least one of the land portions located in the center region or the intermediate regions is formed on fewer than all of the land portions located in the center region and the intermediate regions and is formed in an arc shape in which a ground contact surface representing an outer contour line in a tire meridian cross-sectional view bulges outward in the tire radial direction, and a relationship between a radius of curvature RR of the arc and a radius of curvature TR of an arc forming a tread profile is within a range of $0.1 \leq (RR/TR) \leq 0.25$.

2. The pneumatic tire according to claim 1, wherein
in the tread portion, a relationship between an average thickness Tc of the tread rubber layer located outward, in the tire radial direction, from the belt layer in the center region, and an average thickness Tsh of the tread rubber layer located outward, in the tire radial direction, from the belt layer in the shoulder regions, and an average thickness Tm of the tread rubber layer located outward, in the tire radial direction, from the belt layer in the intermediate regions is within a range of $1.2 \leq (Tc/Tsh) \leq 1.9$ and satisfies a relationship $Tc \geq Tm > Ts$.

3. The pneumatic tire according to claim 2, wherein
a relationship between a thickness Te at an end portion position of the projection-shaped land portion in the tire lateral direction and a thickness Tp at a central position of the projection-shaped land portion in the tire lateral direction is $Tp > Te$.

4. The pneumatic tire according to claim 3, wherein
the belt layer bulges inward in the tire radial direction at a position located inward, in the tire radial direction, of the at least one of the land portions located in the center region and the intermediate regions.

5. The pneumatic tire according to claim 4, wherein
in the tread portion, a relationship between a minimum thickness Tg of a rubber thickness between the belt layer and a groove bottom of the main groove defining the center land portion and the average thickness Tc of the tread rubber layer located outward, in the tire radial direction, from the belt layer in the center region is within a range of $0.12 \leq (Tg/Tc) \leq 0.4$.

6. The pneumatic tire according to claim 5, wherein
a portion of rubber forming the tread rubber layer that is contained in the center region is 10 MPa or more and 16 MPa or less in modulus of 300% elongation.

7. The pneumatic tire according to claim 6, wherein
a circumferential narrow groove extending in the tire circumferential direction and having a narrower groove width than the main groove is formed in at least one of the shoulder regions located on opposite sides in the tire lateral direction.

8. The pneumatic tire according to claim 7, wherein
a portion of the carcass layer located in the shoulder region bulges toward a tire inner surface in an internal-pressure uninflated state.

9. The pneumatic tire according to claim 8, wherein
a belt reinforcing layer is disposed outward of the belt layer in the tire radial direction, and
a larger number of pieces of the belt reinforcing layer are layered at a position of the center region than at positions other than the position of the center region.

10. The pneumatic tire according to claim 1, wherein
a relationship between a thickness Te at an end portion position of the projection-shaped land portion in the tire lateral direction and a thickness Tp at a central position of the projection-shaped land portion in the tire lateral direction is $Tp > Te$.

11. The pneumatic tire according to claim 1, wherein
the belt layer bulges inward in the tire radial direction at a position located inward, in the tire radial direction, of the at least one of the land portions located in the center region and the intermediate regions.

12. The pneumatic tire according to claim 1, wherein
in the tread portion, a relationship between a minimum thickness Tg of a rubber thickness between the belt layer and a groove bottom of the main groove defining the center land portion and an average thickness Tc of the tread rubber layer located outward, in the tire radial direction, from the belt layer in the center region is within a range of $0.12 \leq (Tg/Tc) \leq 0.4$.

13. The pneumatic tire according to claim 1, wherein
a portion of rubber forming the tread rubber layer that is contained in the center region is 10 MPa or more and 16 MPa or less in modulus of 300% elongation.

14. The pneumatic tire according to claim 1, wherein
a circumferential narrow groove extending in the tire circumferential direction and having a narrower groove width than the main groove is formed in at least one of the shoulder regions located on opposite sides in the tire lateral direction.

15. The pneumatic tire according to claim 1, wherein a portion of the carcass layer located in the shoulder region bulges toward a tire inner surface in an internal-pressure uninflated state.

16. The pneumatic tire according to claim 1, wherein a belt reinforcing layer is disposed outward of the belt layer in the tire radial direction, and a larger number of pieces of the belt reinforcing layer are layered at a position of the center region than at positions other than the position of the center region, including positions in the intermediate region.

17. The pneumatic tire according to claim 1, wherein in the tread portion, a relationship between an average thickness Tc of the tread rubber layer located outward, in the tire radial direction, from the belt layer in the center region, and an average thickness Tsh of the tread rubber layer located outward, in the tire radial direction, from the belt layer in the shoulder regions is within a range of $1.7 \leq (Tc/Tsh) \leq 1.9$.

18. A pneumatic tire comprising:

at least one carcass layer;

a belt layer disposed outward, in a tire radial direction, of a portion of the carcass layer located in a tread portion; and a tread rubber layer disposed outward, in the tire radial direction, of the belt layer in the tread portion, the tread portion being provided with a main groove extending in a tire circumferential direction, and a plurality of land portions defined by the main groove, and in the tread portion, assuming that a center region is a region where a center land portion included in the land portions and corresponding to the land portion closest to a tire equatorial plane is located, shoulder regions are each a region between a position corresponding to 85% of a width of the belt layer in a tire lateral direction and an end portion of the belt layer in the tire lateral direction, and intermediate regions are each a region between the center region and a corresponding one of the shoulder regions, a relationship between a tire average thickness Gc in the center region and a tire average thickness Gsh in the shoulder regions and a tire average thickness Gm in the intermediate regions being within a range of $1.05 \leq (Gc/Gsh) \leq 1.35$ and satisfying a relationship $Gc \geq Gm > Gsh$, and in the tread portion, a relationship between an average actual rubber thickness Vc of the tread rubber layer in the center region and an average actual rubber thickness Vsh of the tread rubber layer in the shoulder regions is within a range of $1.7 \leq (Vc/Vsh) \leq 2.5$; wherein a portion of rubber forming the tread rubber layer that is contained in the center region is 12 MPa or more and 16 MPa or less in modulus of 300% elongation, and in the tread portion, a relationship between an average thickness Tc of the tread rubber layer located outward, in the tire radial direction, from the belt layer in the center region, and an average thickness Tsh of the tread rubber layer located outward, in the tire radial direction, from the belt layer in the shoulder regions is within a range of $1.7 \leq (Tc/Tsh) \leq 1.9$.

* * * * *